US012713209B2

(12) United States Patent
Chen et al.

(10) Patent No.: US 12,713,209 B2
(45) Date of Patent: Aug. 18, 2026

(54) GROUP USER COMMUNICATION METHOD AND APPARATUS, NETWORK DEVICE, AND COMPUTER-READABLE STORAGE MEDIUM

(71) Applicant: ZTE CORPORATION, Shenzhen (CN)

(72) Inventors: Lin Chen, Shenzhen (CN); Xiaoying Feng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 328 days.

(21) Appl. No.: 18/577,254

(22) PCT Filed: Jul. 5, 2022

(86) PCT No.: PCT/CN2022/103952

§ 371 (c)(1),
(2) Date: Jan. 6, 2024

(87) PCT Pub. No.: WO2023/280168

PCT Pub. Date: Jan. 12, 2023

(65) Prior Publication Data

US 2025/0016527 A1 Jan. 9, 2025

(30) Foreign Application Priority Data

Jul. 7, 2021 (CN) ......................... 202110765555.5

(51) Int. Cl.
*H04W 28/02* (2009.01)
*H04W 4/08* (2009.01)
(Continued)

(52) U.S. Cl.
CPC ............. *H04W 4/08* (2013.01); *H04W 40/02* (2013.01); *H04W 76/40* (2018.02)

(58) Field of Classification Search
CPC ..... H04W 36/08; H04W 36/22; H04W 36/30; H04W 36/362; H04W 76/20;
(Continued)

(56) References Cited

U.S. PATENT DOCUMENTS

2017/0201918 A1 7/2017 Kim
2020/0228936 A1* 7/2020 Talebi Fard ............ H04W 4/08

FOREIGN PATENT DOCUMENTS

CN 103906152 A 7/2014
CN 110417633 A 11/2019
(Continued)

OTHER PUBLICATIONS

European Patent Office, The Supplementary Partial European Search Report of EP application dated Jun. 3, 2025, for corresponding EP application No. 22836917.9.
(Continued)

*Primary Examiner* — Phuoc H Doan
(74) *Attorney, Agent, or Firm* — Li & Cai Intellectual Property (USA) Office

(57) ABSTRACT

The present application provides a group user communication method, a group user communication apparatus, a network device and a computer-readable storage medium, the group user communication method includes: receiving a packet forwarding request of a first user equipment, wherein the packet forwarding request is configured to request for forwarding a packet to a target user equipment, the first user equipment and the target user equipment are user equipment of a same virtual network group; determining a user plane function entity associated with the target user equipment by searching group-level routing information of a current user plane function entity; and forwarding the packet requested to be forwarded to the target user equipment through the UPF entity associated with the target user equipment.

19 Claims, 8 Drawing Sheets

Receive a packet forwarding request of a first UE, wherein the packet forwarding request is configured to request for forwarding a packet to a target UE, the first UE and the target UE are UE of a same VN group — S410

Determine a UPF entity associated with the target UE by searching group-level routing information of a current UPF entity — S420

Forward the packet requested to be forwarded to the target UE through the UPF entity associated with the target UE — S430

(51) Int. Cl.
*H04W 40/02* (2009.01)
*H04W 76/40* (2018.01)

(58) Field of Classification Search
CPC ......... H04W 36/0058; H04W 36/0033; H04W 24/08; H04W 64/00
See application file for complete search history.

(56) References Cited

FOREIGN PATENT DOCUMENTS

| | | | |
|---|---|---|---|
| CN | 111010673 | A | 4/2020 |
| CN | 111901242 | A | 11/2020 |
| CN | 111917563 | A | 11/2020 |
| CN | 111953576 | A | 11/2020 |
| CN | 112511320 | A | 3/2021 |
| CN | 112583693 | A | 3/2021 |
| CN | 113207096 | A | 8/2021 |
| CN | 113225697 | A | 8/2021 |
| WO | WO2020224556 | A1 | 11/2020 |

OTHER PUBLICATIONS

Huawei et al: “discussion on 5G VN group 1-8,15, communication”, 16 3GPP Draft; S2-1905681 Discussion on 5G VN Group Communication, 3rd Generation Partnership Project (3GPP), May 7, 2019.
WIPO, International Search Report issued on Sep. 20, 2022.
China Patent Office, First Office Action issued Aug. 17, 2021 for application No. CN202110765555.5.
China Patent Office, Notification of grant issued Sep. 10, 2021 for application No. CN202110765555.5.

* cited by examiner

GROUP USER COMMUNICATION METHOD AND APPARATUS, NETWORK DEVICE, AND COMPUTER-READABLE STORAGE MEDIUM

CROSS-REFERENCE TO RELATED APPLICATIONS

The present disclosure is a National Phase Application filed under 35 U.S.C. 371 as a national stage of PCT/CN2022/103952, filed on Jul. 5, 2022, an application claiming the priority of Chinese Patent Application No. 202110765555.5, filed on Jul. 7, 2021, the contents of which are incorporated herein in their entirety by reference.

TECHNICAL FIELD

The present disclosure relates to the field of communications technologies, and in particular, to a group user communication method, a group user communication apparatus, a network device, and a computer-readable storage medium.

BACKGROUND

Mobile communications have now evolved to a phase of the fifth generation (5G) mobile communication. Compared with network architectures of previous generation mobile communication technologies, a main character of 5G network architecture is a service-based architecture. Using 5G network to provide a virtual network (VN) group function is one of promising technologies for market in the related stage.

A VN group may provide partners with a customized 5G industrial local area network, so that enterprise terminals and enterprise cloud are located in a same "local area network". In a current 5G communication scenario, communication between group users in 5G VN group dependents on a session management function entity issuing indications of a Packet Detection Rule (PDR) and a packet Forwarding Action Rule (FAR), and when the users in the 5G VN group are too many, performance consumption of the system increases.

SUMMARY

The present application provides a group user communication method, applied to an user plane function (UPF) entity, including: receiving a packet forwarding request of a first user equipment, wherein the packet forwarding request is configured to request for forwarding a packet to a target user equipment, the first user equipment and the target user equipment are user equipment of a same virtual network group; determining a UPF entity associated with the target user equipment by searching group-level routing information of a current UPF entity; and forwarding the packet requested to be forwarded to the target user equipment through the UPF entity associated with the target user equipment.

The present application provides a group user communication method, applied to a network repository function (NRF) entity, including: receiving a network function (NF) discovery request of a first UPF entity, wherein the NF discovery request includes a group identifier being identifier information sent to the first UPF entity by a session management function (SMF) entity and configured to identify a virtual network group; sending a NF discovery response to the first UPF entity, wherein the NF discovery response carries UPF information of an opposite-end UPF entity associated with the virtual network group and opposite-end tunnel information; and receiving group-level routing information of the first UPF entity, and issuing group-level routing information of the opposite-end UPF entity to the first UPF entity, so that the first UPF entity creates the group-level routing information of the first UPF entity according to the group-level routing information of each opposite-end UPF entity, and performs communication between user equipment in the virtual network group according to the group-level routing information of the first UPF entity.

The present application provides a group user communication method, applied to a SMF entity, including: sending a N4 session creation request to a first UPF entity, wherein the session creation request carries a group identifier and an equipment identifier of a first user equipment, the group identifier is configured to identify a virtual network group; and receiving a N4 session creation response of the first UPF entity, wherein in a process of the first UPF entity creating the N4 session for the first user equipment, group-level routing information corresponding to the equipment information of the first user equipment is added to group-level routing information of the first UPF entity, and communication between user equipment in the virtual network group is performed according to the group-level routing information of the first UPF entity.

The present application provides a group user communication apparatus, applied to a UPF entity, including: a receiving module configured to receive a packet forwarding request of a first user equipment, wherein the packet forwarding request is configured to request for forwarding a packet to a target user equipment, the first user equipment and the target user equipment are user equipment of a same virtual network group; a searching module configured to determine a UPF entity associated with the target user equipment by searching group-level routing information of a current UPF entity; and a sending module configured to forward the packet requested to be forwarded to the target user equipment through the UPF entity associated with the target user equipment.

The present application provides a group user communication apparatus, applied to a NRF entity, including: a receiving module configured to receive a NF discovery request of a first UPF entity, wherein the NF discovery request includes a group identifier being identifier information sent to the first UPF entity by a SMF entity and configured to identify a virtual network group; a sending module configured to send a NF discovery response to the first UPF entity, wherein the NF discovery response carries UPF information of an opposite-end UPF entity associated with the virtual network group and opposite-end tunnel information; the receiving module further configured to receive group-level routing information of the first UPF entity, and issue group-level routing information of the opposite-end UPF entity to the first UPF entity, so that the first UPF entity creates the group-level routing information of the first UPF entity according to the group-level routing information of each opposite-end UPF entity, and performs communication between user equipment in the virtual network group according to the group-level routing information of the first UPF entity.

The present application provides a group user communication apparatus, applied to a SMF entity, including: a sending module configured to send a N4 session creation request to a first UPF entity, wherein the session creation request carries a group identifier and an equipment identifier of a first user equipment, the group identifier is configured to identify a virtual network group; and a receiving module configured to receive a N4 session creation response of the first UPF entity, wherein in a process of the first UPF entity creating the N4 session for the first user equipment, group-level routing information corresponding to the equipment information of the first user equipment is added to group-level routing information of the first UPF entity, and communication between user equipment in the virtual network group is performed according to the group-level routing information of the first UPF entity.

The present application provides a network device, including: at least one processor; and a memory having at least one computer program stored thereon, wherein the at least one computer program, when executed by the at least one processor, causes the at least one processor to implement the group user communication method described above.

The present application provides a computer-readable storage medium having a computer program stored thereon, the computer program, when executed by a processor, causes the processor to implement the group user communication method described above.

With respect to the above aspects and other aspects of the present application and implementations thereof, further description is provided in the description of accompanying drawings, detailed implementation and claims.

DETAIL DESCRIPTION OF EMBODIMENTS

In order to make purposes, technical solutions, and advantages of the present application clearer, implementations of the present application are described below with reference to the accompanying drawings. It should be noted that implementations of the present application and characteristics in the implementations may be combined with each other if no conflict is incurred.

In order to enhance information security, an enterprise network and an industrial network are both based on a Local Area Network (LAN) to implement intercommunication of equipment, which is inconvenient for users to use, and requires special terminal devices with LAN privileges for using, in addition, equipment deployment and maintenance cost of a wired network is very high, and a connection of machine arms or sensors is not convenient.

Network architecture based on 5G communication system is a service-based architecture, and using 5G network to provide a VN group function is one of promising technologies for market of the 3rd generation partnership project (3GPP) in the related stage, and may provide partners with a customized 5G industrial LAN, so that enterprise terminals and enterprise cloud are located in a same "LAN". The technology is mainly oriented to fields of enterprise cloud access, intelligent manufacturing and the like, and implements flexible group management of the terminal, direct communication, and anytime and anywhere access to the enterprise cloud.

Figure 1:
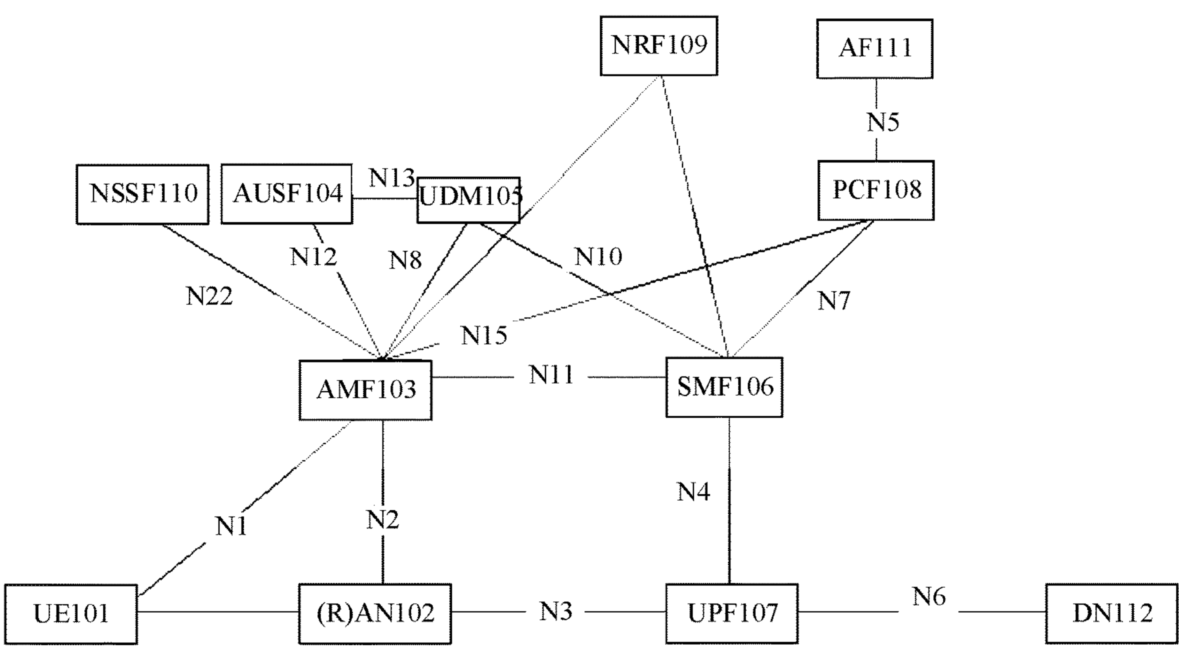
FIG. 1 is a schematic diagram of network architecture of 5G communication system according to the present application.

FIG. 1 is a schematic diagram of network architecture of 5G communication system according to the present application. The network architecture of the communication system includes, but is not limited to: user equipment (UE) 101, a radio access network (RAN) 102, an access and mobility management function (AMF) entity 103, an authentication server function (AUSF) entity 104, an unified data management (UDM) entity 105, a SMF entity 106, a UPF entity 107, a policy control functionality (PCF) entity 108, a NRF entity 109, a network slice selection function (NSSF) entity 110, an application function (AF) entity 111, and a data network (DN) 112.

The UE 101 may access the 5G network through a radio air interface and obtain services, exchange information with a base station through the radio air interface, and exchange information with the AMF 103 of a core network through Non-Access Stratum (NAS) signaling.

The RAN 102 is responsible for air interface resource scheduling and air interface connection management for the UE 101 accessing the network.

The AMF 103 is a control plane entity of the core network, and is mainly responsible for user mobility management including: registration and temporary identifier allocation; maintaining IDLE and CONNECT states and state migration; switching in the CONNECT state; triggering paging in the IDLE state of the user, and the other functions.

The AUSF 104 is a control plane entity of the core network, and is mainly responsible for authentication and authorization for a user to ensure that the user is a valid user.

The UDM 105 is a control plane entity of the core network, belongs to a user server, and permanently stores user subscription data.

The SMF 106 is a control plane entity of the core network, and is mainly responsible for maintaining a Protocol Data Unit (PDU) session, allocating an Internet protocol (IP) address of a user, and has functions such as controlling quality of service (QoS) and charging, and receiving a downlink packet in the IDLE state of the user to buffer and notify AMF 103 of paging the user.

The UPF 107 is a user plane function entity of the core network, and is responsible for forwarding user data packets, and also has functions of counting user data packets for charging, and the like.

The PCF 108 is a control plane entity of the core network, and is a function entity responsible for an access and mobility management strategy, a UE strategy, a session management strategy and a charging rule. The function entity mainly generates the access and mobility management strategy, a UE routing selection strategy, the QoS rule of user data transmission, the charging rule, and the like according to the service information, user subscription information and configuration information of an operator.

The NRF 109 is a control plane entity of the core network, and is responsible for dynamic registration of service capabilities of network functions and network function discovery.

The NSSF 110 is a control plane entity of the core network, and is responsible for selecting a target network slice instance (NSI).

The AF 111 is an application entity responsible for providing a specific service to a user.

The DN 112 may be used to provide a service data network, e.g., a data network corresponding to an operator service, an internet access, a third party service, etc.

In some implementations, the communication system may further include: a binding support function (BSF) entity and a network exposure function (NEF) entity.

The BSF entity may be configured to inquire a PCF entity where the session is located, based on session information, such as an IP address, and a media access control (MAC) address, and the group user communication method provided in the present application can be used for expanding the NF protocol function and also can be used for inquiring information of SMF or UPF where the session is located.

The NEF entity is a control plane entity of the core network and is responsible for external opening of the mobile network capability.

As shown in FIG. 1, the network architecture further include following reference points.

- N1: a reference point between the UE 101 and the AMF 103; N2: a reference point between the (R)AN 102 and the AMF 103;
- N3: a reference point between the (R)AN 102 and the UPF 107; N4: a reference point between the SMF 106 and the UPF 107;
- N5: a reference point between the PCF 108 and the AF 111; N6: a reference point between the PSA UPF 107 and the DN 112;
- N7: a reference point between the SMF 106 and the PCF 108; N8: a reference point between the UDM 105 and the AMF 103;
- N10: a reference point between the UDM 105 and the SMF 106; N11: a reference point between the AMF 103 and the SMF 106;
- N12: a reference point between the AMF 103 and the AUSF 104; N13: a reference point between the UDM 105 and the AUSF 104;
- N15: a reference point between the PCF 108 in a non-roaming scenario and the AMF 103, or a reference point between the PCF 108 in a visited place in a roaming scenario and the AMF 103; N22: a reference point between the AMF 103 and the NSSF 110.

In some following descriptions, the AMF entity may be abbreviated as AMF, the AUSF entity may be abbreviated as AUSF, the UDM entity may be abbreviated as UDM, the SMF entity may be abbreviated as SMF, the UPF entity may be abbreviated as SMF, the PCF entity may be abbreviated as PCF, the NRF entity may be abbreviated as NRF, the NSSF entity may be abbreviated as NSSF, and the AF entity may be abbreviated as AF.

Figure 2:
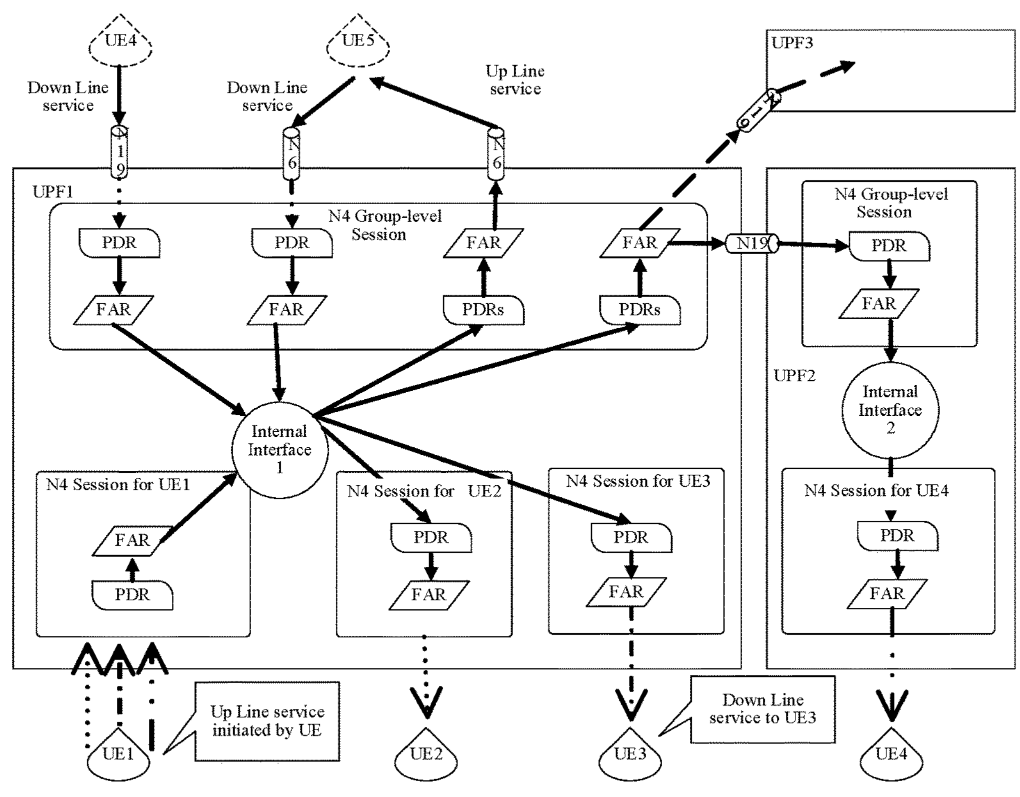
FIG. 2 is a schematic diagram of a communication manner of user equipment in 5G VN group in 5G communication scenario according to the present application.

FIG. 2 is a schematic diagram of a communication manner of user equipment in 5G VN group in 5G communication scenario according to the present application.

User equipment in the 5G VN group are exemplarily shown in FIG. 2, such as UE1, UE2, UE3, UE4 and UE5. UE1, UE2, UE3, and UE5 are associated with UPF1, UE4 is associated with UPF2, and UE5 is associated with UPF3.

In some implementations, 5G VN group communication includes one-to-one communication and one-to-many communication. The one-to-one communication supports unicast traffic forwarding between two UEs in the 5G VN group or between UE and a device on the DN. The one-to-many communication supports multicast and broadcast traffic forwarding from one UE (or the device on the DN) to many or all UE in the 5G VN group and many or all devices on the DN.

As shown in FIG. 2, according to a forwarding path, the 5G VN group communication may include following three statistical ways: a local switch manner, a N6-based communication manner, and a N19-based communication manner.

Based on the local switch manner, if a current UPF entity is a UPF entity of the common PDU session anchor (PSA) of different PDU sessions in a same 5G VN group, data traffics are locally switched by a single UPF entity.

For the N6-based communication manner, up line (UL)/down line (DL) traffics of the 5G VN group communication is forwarded to or from the DN.

For the N19-based communication manner, UL/DL communication used for the 5G VN group communication is forwarded between PSA UPF of different PDU sessions through N19. The N19 is a shared user plane tunnel based on PSA UPFs sharing a single 5G VN group. The N19 is a reference point between two PSA UPFs of 5G LAN-type service.

In FIG. 2, the 5G VN group includes UPF internal interfaces, such as a VN internal interface 1 and a VN internal interface 2. It can be seen from FIG. 2, regardless of communication manners, the VN internal interface is used and the following two-operation process of detection and forwarding is performed to implement traffic forwarding in the 5G VN group.

In a first operation, a packet received from any 5G VN group member (communication manner is communicating by PDU session, N6 or N19) is forwarded to an associated UPF internal interface (i.e., a destination interface of the packet is set to a 5G VN internal interface).

In a second operation, a PDR installed on the UPF internal interface (i.e. a source interface of the packet is set to a 5G VN internal interface) detects the packet and forwards the packet to a corresponding 5G VN group member (using a corresponding communication manner).

As shown in FIG. 2, in the current 5G communication scenario, communication between the group user equipment relies on the SMF issuing PDR and FAR indications through a N4 interface, and in this way, if there are too many users in the group, a challenge may be posed to N4 signaling interaction, and especially, an existing Ethernet packet filter may only support 16 MAC addresses to carry, and an IP Filter can only carry 4 IP addresses. The users are frequently online and offline, or move, and PDR/FAR of a session is continuously modified, so that performance consumption of the system is increased.

Figure 3:
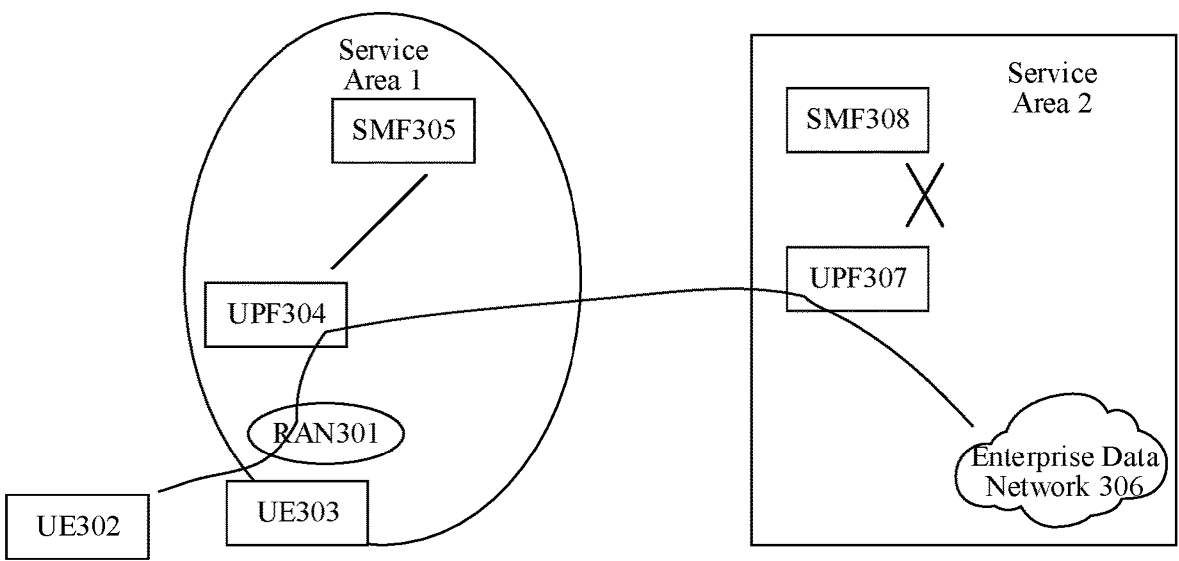
FIG. 3 is a schematic diagram of a scenario of providing a group service across SMF service areas according to the present application.

FIG. 3 is a schematic diagram of a scenario of providing a group service across SMF service areas according to the present application. As shown in FIG. 3, UE 302 and UE 303 in RAN 301 are associated with UPF 304 being within service area of SMF 305; an enterprise data network 306 is associated with UPF 307 being within service area of SMF 308. The SMF 305 is in service area 1, the SMF 308 is in service area 2, and the service area 1 and the service area 2 are different service areas.

As shown in FIG. 3, because of relying on direct control of the SMF, only one VN group is limited to access under one SMF, when the UE 302 communicates with the enterprise data network 306, the group service across the SMF service area may not be provided, and resulting in that disaster recovery function of SMF cannot be implemented.

Figure 4:
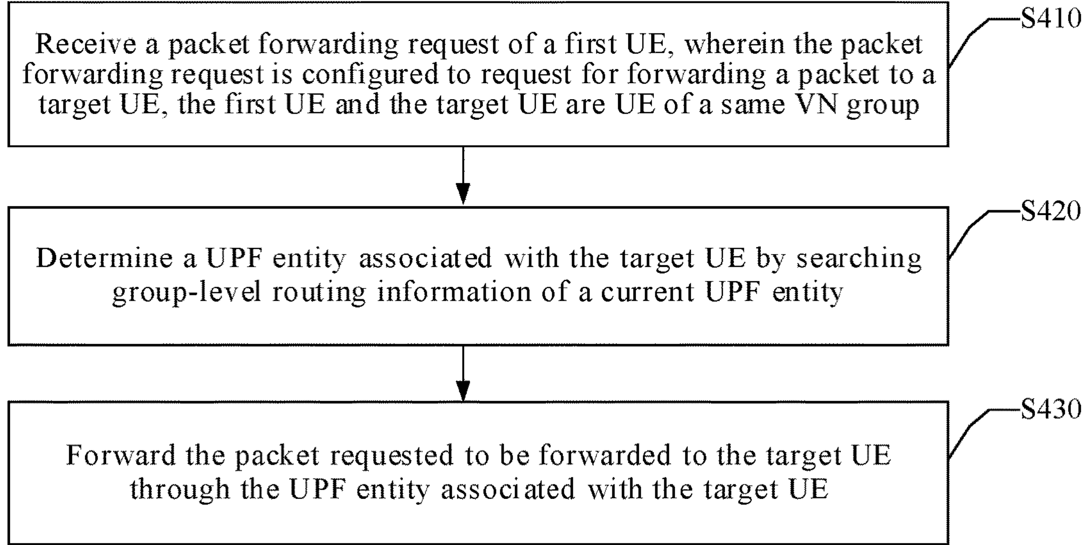
FIG. 4 is a flowchart of a group user communication method according to the present application.

FIG. 4 is a flowchart of a group user communication method according to the present application. The group user communication method may be applied to a UPF. As shown in FIG. 4, the method may include operations S410 to S430.

At operation S410, receive a packet forwarding request of a first UE, wherein the packet forwarding request is configured to request for forwarding a packet to a target UE, the first UE and the target UE are UE of a same VN group.

At operation S420, determine a UPF entity associated with the target UE by searching group-level routing information of a current UPF entity.

At operation S430, forward the packet requested to be forwarded to the target UE through the UPF entity associated with the target UE.

According to the group user communication method provided in the present application, when the current UPF entity receives a packet of any one UE in the 5G VN group and needs to forward the packet to the target UE in the same 5G VN group, the packet requested to be forwarded can be forwarded to the target UE through the inquired UPF entity associated with the target UE, thereby realizing dynamic creation of group network across UPFs. Since the UPF is not limited to be associated with a same SMF, the group network can be dynamically created across the SMFs, and complexity of network operation and maintenance is simplified.

In some implementations, a visited place of forwarding a data packet is provided with a UPF supporting locally assigning a tunnel identifier and a Nupf service interface, and having been registered to the NRF, and the UPF can be discovered by other UPFs.

In some implementations, before operation S410, the group user communication method further include operations S11 and S12. At operation S11, send a registration request to a NRF entity after the current UPF entity is powered on, wherein the registration request carries registration information at least including VN group information supported by the current UPF entity. At operation S12, receive a registration response returned by the NRF entity in response to the registration request, so as to determine that the current UPF entity is successfully registered on the NRF entity.

Through operations S11 and S12, the UPF entity registers the supported group information with the NRF entity, and in actual applications, the UPF entity only registers with the NRF entity once when being powered on and does not registers frequently, thereby simplifying a process of the network operation and maintenance.

Figure 5:
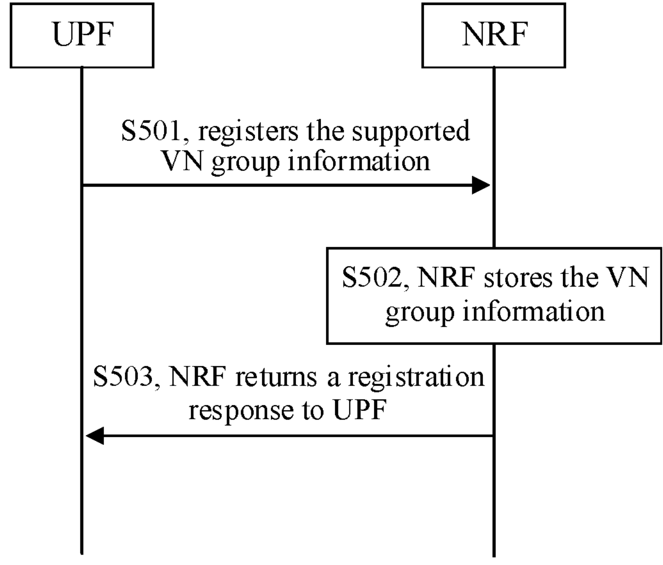
FIG. 5 is a schematic flowchart of a UPF entity registering with a NRF entity according to the present application.

FIG. 5 is a schematic flowchart of a UPF entity registering with a NRF entity according to the present application.

As shown in FIG. 5, the UPF may support static LAN configuration, and when the UPF is powered on, the process of the UPF registering with the NRF may include operations S501 to S503.

At operation S501, the UPF registers the supported VN group information with the NRF.

In this operation, the VN group information may include a supported VN group list and information of an associated N19 tunnel. In some implementations, the UPF may also register information of IP address and/or MAC address of the UE associated with the UPF with the NRF.

At operation S502, the NRF stores the VN group information.

At operation S503, the NRF returns a registration response to the UPF.

Through the above operations S501 to S503, registration of the UPF entity with the NRF entity is implemented.

In some implementations, the registration information further includes group-level tunnel information associated with the current UPF entity; after the current UPF entity is determined to be successfully registered on the NRF entity, the group user communication method further includes operations S21 and S22.

At operation S21, initiate a registration update request to the NRF entity triggered by a preset trigger event.

The registration update request carries updated registration information, the preset trigger event includes at least one of: the VN group information configured by the current UPF entity is changed, the current UPF entity accesses a new VN group, or the group-level tunnel associated with the current UPF entity is changed.

At operation S22, receive a registration update response returned by the NRF entity in response to the registration update request, so as to determine that the current UPF entity is successfully registered and updated on the NRF entity.

In the implementation, when configuration of the UPF is changed, or the UPR accesses a new group or user, the UPF updates the registration information with the NRF.

In some implementations, if the registration information further includes equipment information in the VN group, the trigger event further includes that the UE is changed; the equipment information includes at least one of a network address of the equipment or a MAC address of the equipment; the UE changing includes a new UE accessing and an existing UE being offline.

In the implementation, assuming that the UPF entity is expected to register the UE information in the VN group with the NRF entity, when the new UE access or the existing UE is offline, the registration update of the UPF entity with the NRF entity is also triggered.

Figure 6:
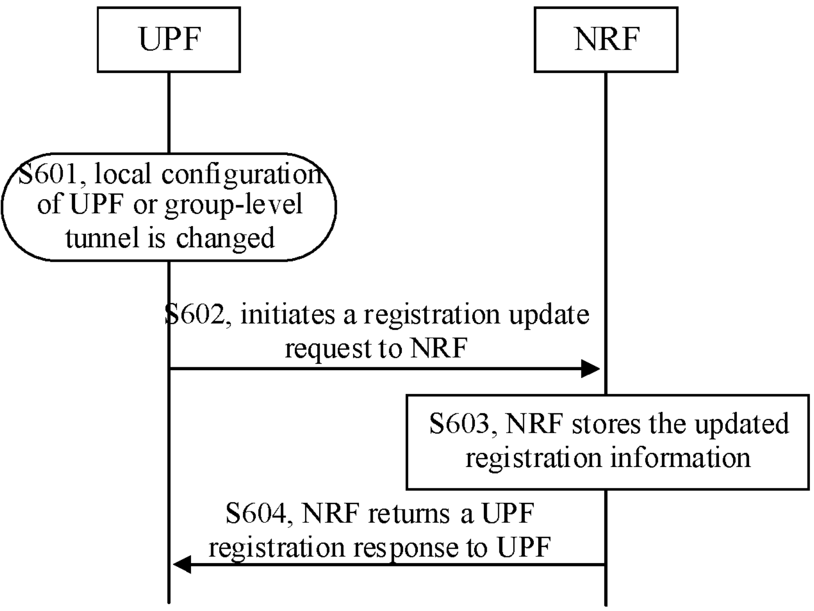
FIG. 6 is a schematic flowchart of a UPF entity updating registration information to a NRF entity according to the present application.

FIG. 6 is a schematic flowchart of a UPF entity updating registration information to a NRF entity according to the present application.

As shown in FIG. 6, when the UPF is changed, or access a new group or UE, a process of updating the registration information with the NRF may include operations S601 to S604.

At operation S601, local configuration of the UPF or group-level tunnel is changed.

For example, the local configuration changing includes deleting or adding groups, or accessing the new group.

At operation S602, the UPF initiates a registration update request to the NRF, wherein the registration update request includes updated registration information.

At operation S603, the NRF stores the updated registration information.

In some implementations, the NRF may also check whether other UPFs subscribe to the information, including one of an implicit subscription and an explicit subscription, so as to send change notification messages to relevant UPFs.

At operation S604, the NRF returns a UPF registration response.

Through the above operation S601 to S604, the registration update of the UPF entity with the NRF entity is implemented.

In some implementations, before receiving a packet forwarding request of the first UE, the group user communication method further includes operations S31 to S34.

At operation S31, receive a N4 session creation request of a SMF entity, wherein the session creation request carries group-level session information including a group identifier and an equipment identifier of the first UE, and the group identifier is configured to identify the VN group.

At operation S32, in response to that the current UPF entity searches creation information of the VN group, add group-level routing information corresponding to equipment information of the first UE to group-level routing information of the current UPF entity.

At operation S33, trigger an opposite-end UPF entity associated with the VN group to update group-level routing information of the opposite-end UPF entity according to UE address information of the first UE.

At operation S34, return a session creation response to the SMF entity for indicating that the N4 session creation of the first UE is successful.

In the implementation, if the current UPF entity finds the creation information of the VN group, it indicates that the current UPF entity has joined the VN group, and if the first UE is not the first one UE accessing the current UPF entity, the current UPF entity has stored own group-level routing information, the own group-level routing information is not expected to be recreated, and the group-level routing information corresponding to the equipment information of the first UE is directly added to the group-level routing information of the current UPF entity.

In the implementation, when any member UE in the VN group creates a N4 session, the SMF only issues information of the group identifier, and does not issue the PDR and the FAR of the group; the UPF finds the opposite-end UPF associated with the VN group from the NRF, reports the group-level routing information of the UPF to the NRF entity, and receives the group-level routing information of the opposite-end UPF issued by the NRF, thereby learning opposite-end routing independently, and triggering the opposite-end UPF to update the group-level routing information of the UPF, so as to facilitate subsequent dynamic creation of the group network across UPFs or SMFs.

In some implementations, the UPF may acquire a diversion rule (or a traffic diversion rule) in a diversion rule library through an in-band tunnel, which can be used to allocate network traffic of all linked UE for a number of days in the future according to the traffic diversion rule.

In some implementations, the group-level session information for which the UPF registers with the NRF in operation S31 includes, but is not limited to: group identifier, equipment identifier of any UE desiring to create the N4 session in the VN group, a tunnel endpoint identifier (TEID) of a group-level tunnel, tunnel capacity load, and other information.

In some implementations, if the current UPF entity does not find the creation information of the VN group, before operation S32, the group user communication method further include operation S41 to S45.

At operation S41, send a NF discovery request including the group identifier to a NRF entity.

At operation S42, receive a NF discovery response returned by the NRF entity in response to the NF discovery request, wherein the NF discovery response carries UPF information of the opposite-end UPF and opposite-end tunnel information.

At operation S43, establish, by the current UPF entity, a group-level N19 tunnel of the VN group.

At operation S44, report the group-level routing information of the current UPF entity to the NRF entity.

At operation S45, generate the group-level routing information of the current UPF entity according to the group-level routing information of the opposite-end UPF entity issued by the NRF entity.

In some implementations, the current UPF entity does not find the creation information of the VN group, it indicates that the current UPF entity does not join the VN group, the first UE is the first time to access the current UPF entity; in such case, the UPF entity may search information of the opposite-end UPF entity associated with the VN group from the NRF entity through a NFDiscovery interface, and then create a N19 tunnel by itself, learn information of an IP/MAC forwarding table, so as to generate and store the group-level routing information of the current UPF.

In the group user communication method provided in the present application, when the UPF entity registers with the NRF entity, the registration information carried in the registration request may include an address field for subsequently allocating an address to a UE accessing the VN group. At this time, in the process of requesting to create a N4 session for the first UE, even if the first UE accesses the current UPF for the first time, the opposite-end UPF entity associated with the VN group may not be triggered to update the group-level routing information of the opposite-end UPF entity according to the UE address information of the first UE.

When the UPF entity registers with the NRF entity, the registration information carried in the registration request may include the equipment information in the VN group, and is used to separately register the equipment information of the UE in the VN group with the NRF; at this time, if the first UE accesses the current UPF for the first time, in the process of requesting to create a N4 session for the first UE, the opposite-end UPF entity associated with the VN group is triggered to update the group-level routing information of the opposite-end UPF entity according to the UE address information of the first UE. and above operation S33 may be implemented in following two ways.

In some implementations, if the registration information carried in the registration request sent by the current UPF entity to the NRF entity includes equipment information in the VN group, the above operation S33 may include: sending a first group-level session update request to the NRF entity, wherein the first group-level session update request carries the equipment information of the first UE, and is configured to request the NRF entity to notify each opposite-end UPF entity of adding the group-level routing information corresponding to the equipment information of the first UE.

In the implementation, the UPF may directly update the group-level session information with the NRF, and then the NRF notifies change information to each UPF, so that each UPF adds the group-level routing information corresponding to the equipment information of the first UE.

In some implementations, if the registration information carried in the registration request sent by the current UPF entity to the NRF entity includes equipment information in the VN group, the above operation S33 may include: sending a first access notification to each opposite-end UPF entity, wherein the first access notification carries the equipment information of the first UE, so as to notify each opposite-end UPF entity of adding the group-level routing information corresponding to the equipment information of the first UE.

In the implementation, the UPF may send the access notification about a new UE to each opposite-end UPF, respectively, so as to inform the equipment information (IP address, MAC address, etc.) of the associated new accessing UE.

Two schematic flow diagrams for accessing the UPF by the UE are described below as examples with reference to FIG. 7 and FIG. 8.

Figure 7:
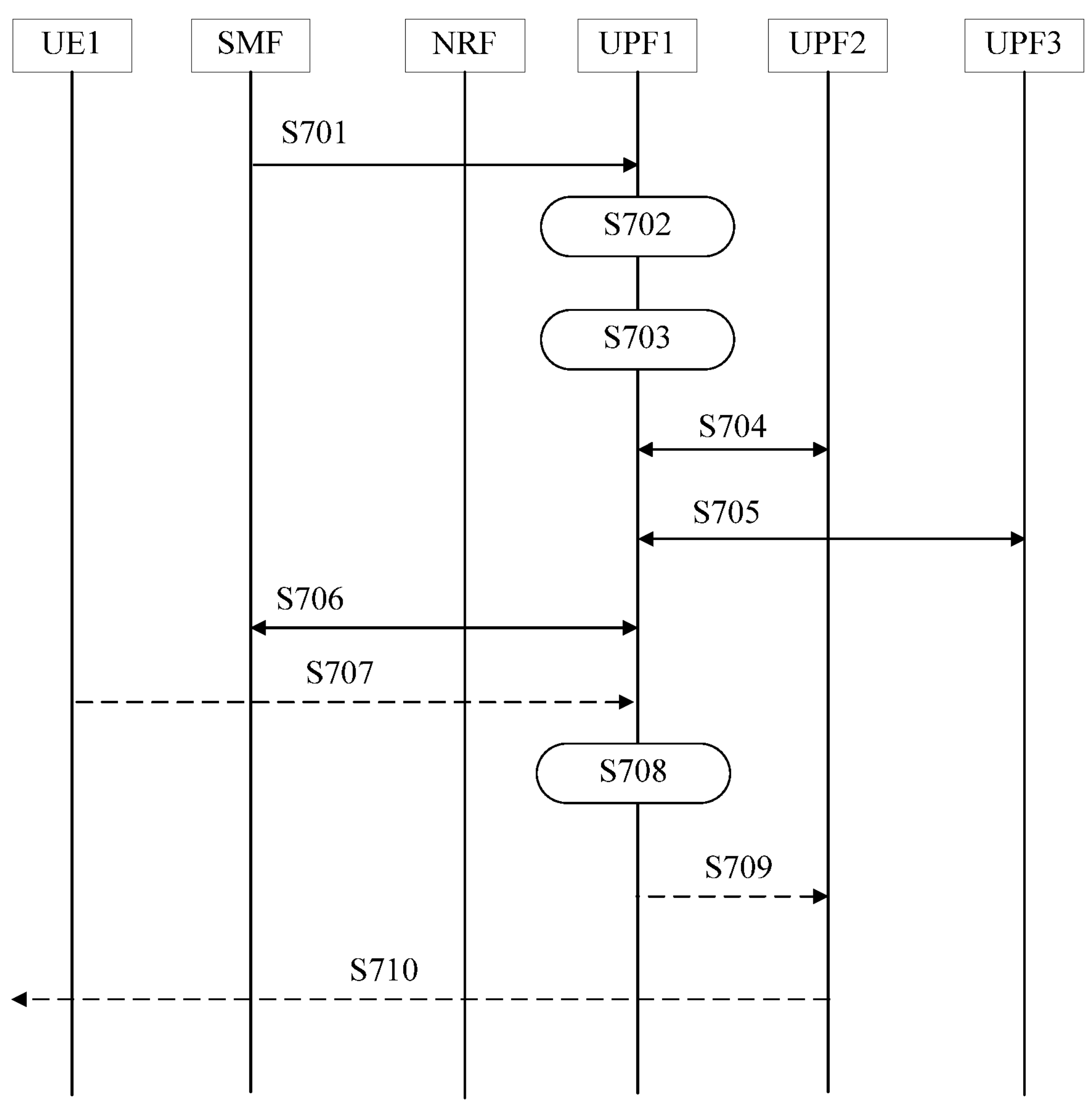
FIG. 7 is a schematic flowchart of a UPF entity being accessed by user equipment in a virtual group according to the present application.

FIG. 7 is a schematic flowchart of a UPF entity being accessed by user equipment in a virtual group according to the present application. In FIG. 7, UPF1 is the current UPF, UPF2 and UPF3 are opposite-end UPFs associated with the VN group, UE1 is a first UE in the VN group (GROUP1), and a UE of a user in the VN group accessing the current UPF for the first time is UE1.

As shown in FIG. 7, a process of accessing the UPF by the UE may include operations S701 to S710.

At operation S701, a SMF initiates a N4 session creation request for the first UE (i.e., UE1).

In this operation, information of a group identifier of the VN group GROUP1 is carried in the N4 session creation request. Before operation S701, the N4 session creation request is a session creation request sent by the SMF to UPF1 in responds to a user access request of the first UE (UE1).

At operation S702, UPF1 does not find creation information of GROUP1 locally, and inquires UPF information managed by a NRF and opposite-end tunnel information from the NRF, for example, the NRF returns information of an opposite-end UPF, such as UPF information of UPF2 and UPF3.

At operation S703, UPF1 creates a group-level N19 tunnel of GROUP1, and registers the group-level session information with the NRF.

At operation S704, UPF1 sends an access notification to UPF2 to inform UPF2 of the information of the IP address or MAC address of the first UE (UE1).

At operation S705, UPF1 sends an access notification to UPF3 to inform UPF3 of the information of the IP address or MAC address of the first UE (UE1).

If GROUP1 associates with more UPFs, a process is performed as operation S704 or S705, and is not repeated herein.

In the example, some implementations may include above operations S704 and S705, some implementations may not include above operations S704 and S705; for example, when UPF1 entity registers with the NRF entity, if UPF1 entity registers the UE information in the VN group with the NRF entity, the access notifications are sent to the UPF2 and UPF3, respectively, by performing above operations S704 and S705.

In some implementations, the group-level session information may also be directly updated with the NRF, and then the change message is notified by the NRF to each UPF.

At operation S706, UPF1 returns a session creation success response to the SMF.

In this operation, the SMF returns a user access success response to the first UE (UE1) in response to the session creation success response.

At operation S707, an uplink packet from the first UE (UE1) to UE2 reaches UPF1.

At operation S708, the UPF inquires a forwarding relationship.

At operation S709, UPF1 finds that UE2 is associated with UPF2, and forwards the packet through the N19 tunnel.

At operation S710, after receiving the uplink packet, UPF2 forwards the packet to UE2.

Through above operations S701 to S710, when the UE in the VN group accessing for the first time, the current UPF finds the information of the opposite-end UPF associated with the VN group from the NRF, and then create a N19 tunnel by itself, learns the opposite-end routing, and when receiving a packet forwarding request of the first UE, implements group communication across UPFs in the 5G.

Figure 8:
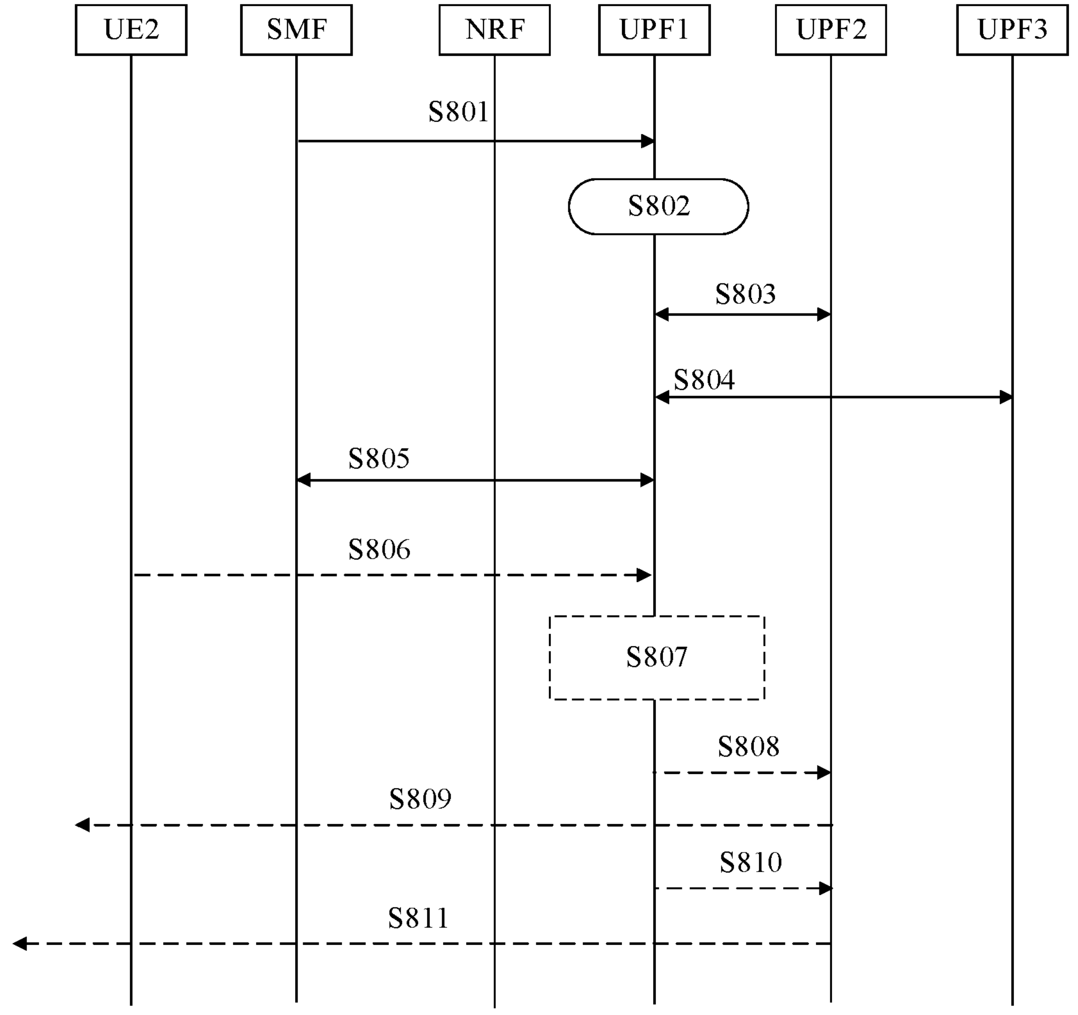
FIG. 8 is a schematic flowchart of a UPF entity being accessed by user equipment in a virtual group according to the present application.

FIG. 8 is a schematic flowchart of a UPF entity being accessed by user equipment in a virtual group according to the present application.

In FIG. 8, UPF1 is a current UPF, UPF2 and UPF3 are opposite-end UPFs associated with the VN group GROUP1, UE1 and UE2 are respectively any two UE in GROUP1. In the example, UPF1 has been accessed by UET in GROUP1, and desires to be accessed by another UE2 in GROUP1 again.

As shown in FIG. 8, a process of the UE2 accessing UPF may include operations S801 to S811.

At operation S801, a SMF initiates a N4 session creation request for UE2, the N4 session creation request carries group information of GROUP1.

At operation S802, if UPF1 finds the group information of GROUP1 locally, group-level routing information corresponding to equipment information of UE2 is directly added to local group-level routing information of UPF1, for example, a local forwarding table.

At operation S803, UPF1 sends UE2 access notification to the associated UPF2 to inform UPF2 of information of an IP address or an MAC address of the accessed UE2.

At operation S804, UPF1 sends UE2 access notification to the associated UPF3 to inform UPF3 of information of the IP address or the MAC address of the accessed UE2.

In the example, some implementations may include operations S803 and S804, some implementations may not include operations S803 and S804, for example, when UPF1 entity registers with the NRF entity, if UPF1 entity registers the UE information in the VN group with the NRF entity, the access notifications are sent to the UPF2 and UPF3, respectively, by performing above operations S803 and S804.

For example, in some implementations, the group-level session information may also be updated directly with the NRF, and then the change message is notified by the NRF to each UPF.

At operation S805, UPF1 returns a session creation success response to the SMF.

In this operation, the SMF returns a user access success response to UE2 in response to the session creation success response.

At operation S806, a multicast packet or a broadcast packet initiated by UE2 reaches UPF1.

At operation S807, UPF1 inquires a forwarding relationship, if it finds local user in GROUP1, directly performs a local forwarding.

At operation S808, UPF1 finds user in GROUP1 on UPF2, and copies and forwards the packet to UPF2 through a N19 tunnel.

At operation S809, after receiving a downlink packet, UPF2 forwards the downlink packet to a corresponding user.

If there also be user accessing UPF3, processing operations S810 and S811 for UPF3 are similar to processing operations S810 to S809 for UPF2 described above, and are not repeated herein.

UE offline process is similar to the process shown in FIG. 8, the difference is that in operation S802, UPF1 finds the group information of GROUP1 locally, and then directly deletes group-level routing information corresponding to offline equipment from the local group-level routing information of UPF1; in operations S803 and S804, UPF1 sends a notification to the UPF2 and the UPF3 to inform UPF2 and UPF3 to delete the group-level routing information corresponding to equipment information of the offline equipment.

In the above example, a processing process of an unicast packet may reference to operations S707 to S710 shown in FIG. 7, and thus are not repeated herein.

Figure 9:
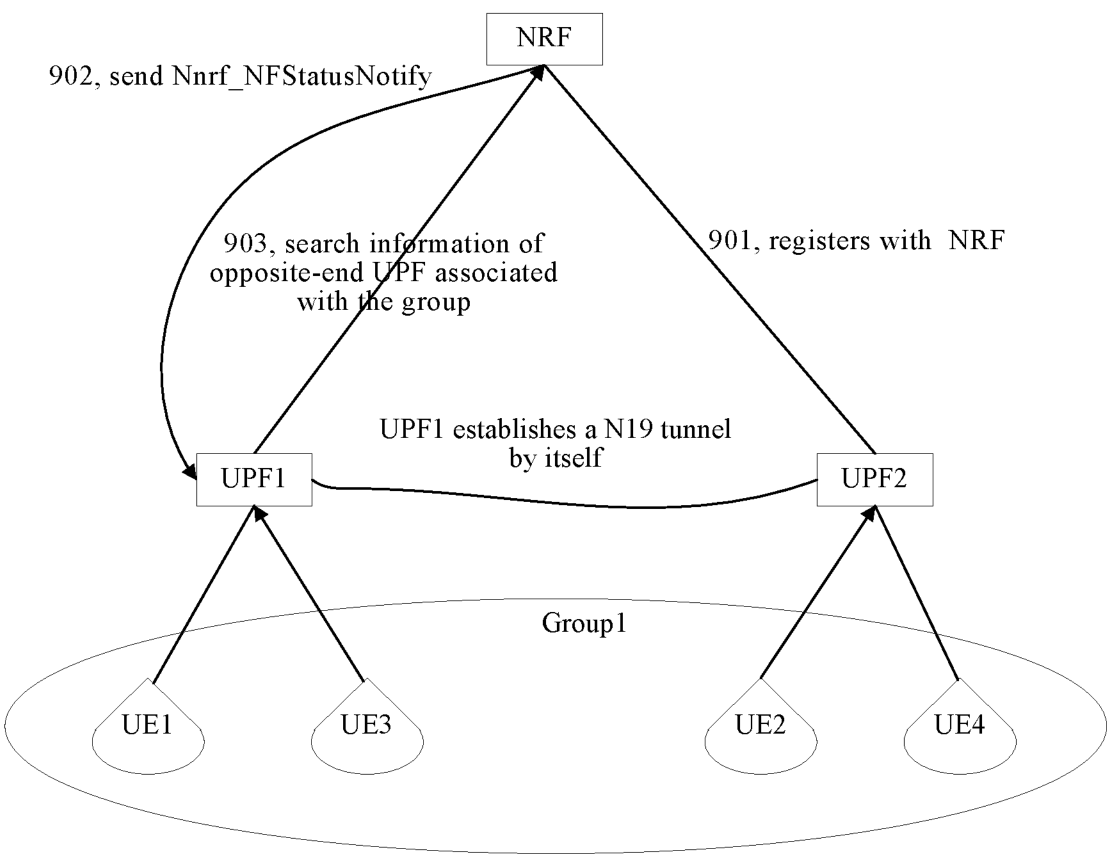
FIG. 9 is a schematic flowchart of interaction between a UPF entity and a NRF entity according to the present application.

FIG. 9 is a schematic flowchart of interaction between a UPF entity and a NRF entity according to the present application.

In FIG. 9, UE1 to UE4 are UE in a same VN group (Group1), UE1 and UE3 access UPF1, and UE2 and UE4 access UPF2.

When UPF1 is powered on or UPF2 is powered on, registration requests may be initiated to the NRF.

As "901" shown in FIG. 9, taking that UPF2 registers with the NRF as an example, UPF2 registers supported group information with the NRF, and UPF2 may also register an address field with the NRF for subsequent accessing UE in the VN group, or individually register equipment information of the UE in the VN group with the NRF.

As "902" shown in FIG. 9, the NRF sends a change notification message (Nnrf_NFStatusNotify) to UPF1 according to registration information carried in a registration request.

As "903" shown in FIG. 9, UPF1 may search information of opposite-end UPF associated with the group from the NRF through a discovery interface (Nnrf_NFDiscovery).

As "904" shown in FIG. 9, UPF1 establishes a N19 tunnel by itself, and learns information of an IP/MAC forwarding table.

In the example, the UPF exposes group-level LAN session information to the NRF and learns opposite-end routing, thereby facilitating dynamic group network creation across UPFs (or across SMFs), and simplifying complexity of network operation and maintenance.

Figure 10:
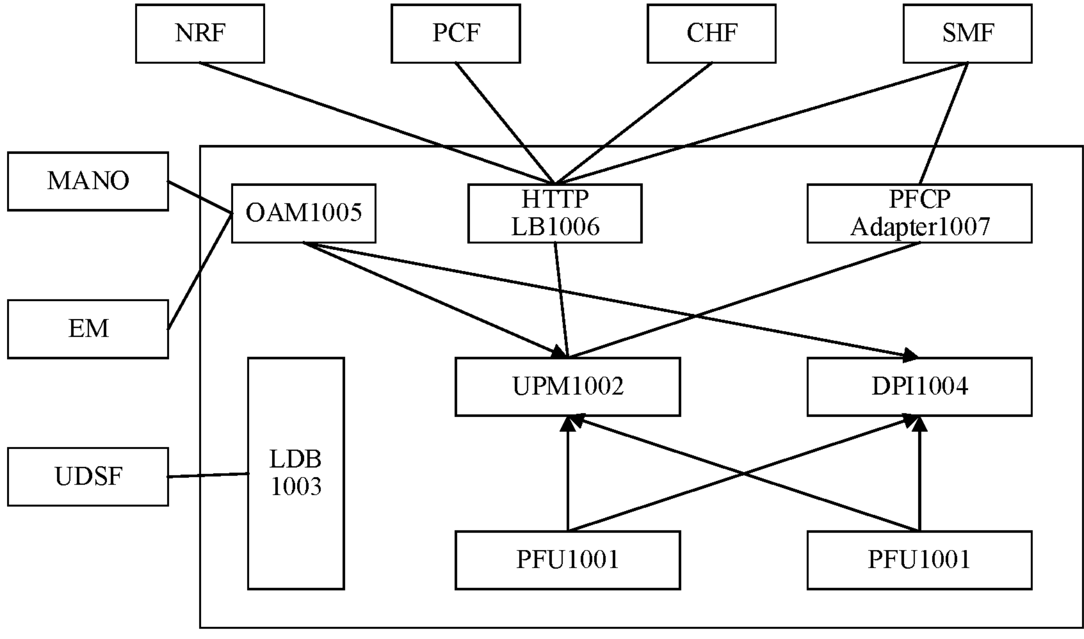
FIG. 10 is a schematic structural diagram of internal modules of a UPF entity according to the present application.

FIG. 10 is a schematic structural diagram of internal modules of a UPF entity according to the present application. In FIG. 10, the internal modules of the UPF may include: a packet forward unit (PFU) 1001, a PFU manger (UPM) 1002, a local database (LDB) module 1003, a deep packet inspection (DPI) module 1004, an operation administration and Maintenance (OAM) module 1005, a Hypertext transfer protocol load balance (HTTP LB) module 1006, and a packet forwarding control protocol adapter (PFCP Adapter) 1007.

The PFU 1001 is configured to forward and process packets of N3, N6, and N9 interfaces.

The UPM 1002 is configured to manage a life cycle of the PFU, and allocate and manage user plane resources; receive and transmit the packet of N4 interface, and process information related to a PFCP node; and distribute a PFCP session message to the PFU, and implementation request of the UPM 1002 is separable and combinable with the PFU 1001.

The LDB 1003 provides state data backup for other micro services internally in the UPF, and implement stateless operation of the other micro services in the UPF, and implementation request of the LDB 1003 is separable and combinable with the PFU 1001.

The DPI 1004 exists as an independent micro service in 5G core (5GC) network, and may be deployed in conjunction with PFU.

The OAM 1005 is a configuration management service in NF, and completes configuration, tracking and other functions.

The HTTP LB 1006 is configured as a protocol load balancing module and is also responsible for HTTP coding and decoding.

The PFCP Adapter 1007 is responsible for PFCP protocol coding and decoding.

In the group user communication method provided in the present application, for Ethernet access, one customer premise equipment (CPE) may have a plurality of Ethernet terminals, i.e., one CPE may have at least one MAC address, and is expected to collect MAC addresses in time and distribute the MAC addresses to all associated UPFs in the VN group.

In some implementations, if it is detected that a new MAC address accesses the first UE, the group user communication method further includes: sending a second group-level session update request to a NRF entity registered with the current UPF entity, wherein the second group-level session update request carries the new MAC address of the first UE, so as to request the NRF entity to notify each opposite-end UPF entity associated with the VN group of adding group-level routing information corresponding to the new MAC address.

In the implementation, the group-level session information may be directly updated with the NRF, and then notified to the each UPF by the NRF.

In some implementations, if it is detected that a new MAC address accesses the first UE, and registration information carried in a registration request sent by the current UPF entity to the NRF entity includes equipment information in the VN group, the group user communication method further includes: sending a second access notification to each opposite-end UPF entity associated with the VN group, wherein the second access notification carries the new MAC address of the first UE, so as to notify each opposite-end UPF entity of adding group-level routing information corresponding to the new MAC address of the first UE.

In the implementation, when UPF1 entity registers with the NRF entity, if UPF1 entity registers the UE information in the VN group with the NRF entity, UPF1 entity sends an access notification to each opposite-end UPF entity associated with the VN group, so that all associated UPFs in the VN group update the group-level routing information corresponding to the new MAC address.

In some implementations, if an aged MAC address is monitored, the group user communication method further includes: sending a third group-level session update request to a NRF entity registered with the current UPF entity to request the NRF entity to notify each opposite-end UPF entity associated with the VN group of deleting group-level routing information corresponding to the aged MAC address. In some implementations, if an aged MAC address is monitored, and registration information carried in a registration request sent by the current UPF entity to the NRF entity includes equipment information in the VN group, the group user communication method further includes: sending a third access notification to each opposite-end UPF associated with the VN group, wherein the third access notification carries the aged MAC address of the first UE, so as to notify each opposite-end UPF entity associated with the VN group of deleting group-level routing information corresponding to the aged MAC address.

The aged MAC address is a MAC address of a UE associated with the current UPF entity, and no corresponding packet interaction of the aged MAC address exists within a preset MAC address aging duration.

In the implementation, the current UPF may set an MAC aging timer, and if no packet corresponding to the MAC address within a set duration, the current UPF initiates an MAC aging process and notify the associated UPFs of deleting a corresponding MAC forwarding record.

In some implementations, if the packet requested to be forwarded is a unicast packet, above operation S430 may include operations S51 and S52.

At operation S51, if the UPF entity associated with a target UE is the current UPF entity, forward the packet requested to be forwarded to the target UE in a local exchange mode. At operation S52, if the UPF entity associated with the target US is any one of opposite-end UPF entities in the VN group, forward the packet requested to be forwarded to the opposite-end UPF entity associated with the target UE through a group-level N19 tunnel, so as to forward the packet to the target UE through the opposite-end UPF entity associated with the target UE.

In the implementation, for the unicast packet requested to be forwarded, the packet may be sent to the opposite-end UPF entity associated with the target UE through the group-level N19 tunnel, so that the packet is forwarded to the target UE through the opposite-end UPF entity associated with the target UE, thereby implementing group equipment communication across UPFs.

In some implementations, the packet requested to be forwarded is a multicast packet or a broadcast packet, operation S430 include operations S53 and S54.

At operation S53, forward the packet requested to be forwarded to a local UE through a local exchange mode, wherein the local UE is UE associated with the current UPF entity in the VN group. At operation S54, forward the packet requested to be forwarded to an opposite-end UPF entity associated with other UE through a group-level N19 tunnel, so as to forward the packet requested to be forwarded to the other UE through the opposite-end UPF entity associated with the other UE, wherein the other UE is UE associated with any one of the opposite-end UPF entities in the VN group.

In the implementation, for the multicast packet or the broadcast packet requested to be forwarded, the packet may be sent to the opposite-end UPF entity associated with the VN group through the group-level N19 tunnel, so as to forward the packet to each associated UE through the opposite-end UPF entity, thereby implementing group equipment communication across UPFs.

In some implementations, the group user communication method further includes operations S61 and S62.

At operation S61, receive a packet sent by an opposite-end UPF entity in the VN group, wherein the packet sent by the opposite-end UPF entity carries a destination address of the packet, and the UE corresponding to the destination address of the packet is associated with the current UPF entity.

At operation S62, forward the packet sent by the opposite-end UPF entity to the UE corresponding to the destination address of the packet.

In the implementation, if the current UPF receives the packet sent by the opposite-end UPF entity, the current UPF directly performs internal forwarding on the packet to the target UE.

In some implementations, if the packet sent by the opposite-end UPF entity is a unicast packet, the UE corresponding to the destination address of the packet is one of the UE associated with the current UPF entity; and if the packet sent by the opposite-end UPF entity is a multicast packet or a broadcast packet, the UE corresponding to the destination address of the packet is each UE associated with the current UPF entity.

In the implementation, according to a packet type, the current UPF may select to send the packet forwarded by the opposite-end UPF entity to one target UE (for the unicast packet) or each accessed UE (for the multicast packet or the broadcast packet), so as to implement group equipment communication across UPFs.

Figure 11:
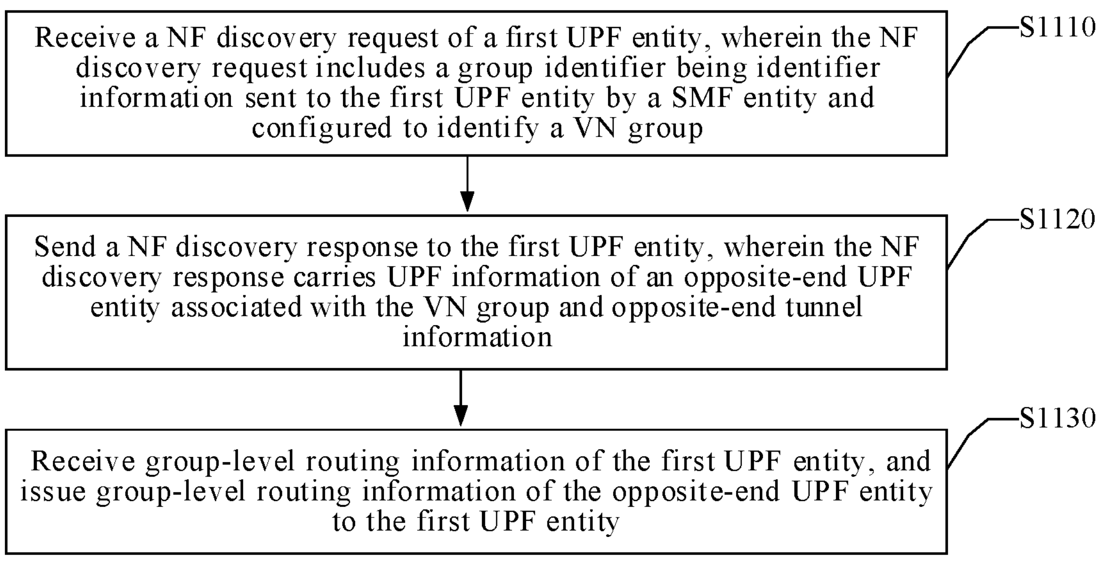
FIG. 11 is a flowchart of a group user communication method according to the present application.

FIG. 11 is a flowchart of a group user communication method according to the present application. The group user communication method may be applied to a NRF, and includes operations S1110 and S1130.

At operation S1110, receive a NF discovery request of a first UPF entity, wherein the NF discovery request includes a group identifier being identifier information sent to the first UPF entity by a SMF entity and configured to identify a VN group.

At operation S1120, send a NF discovery response to the first UPF entity, wherein the NF discovery response carries UPF information of an opposite-end UPF entity associated with the VN group and opposite-end tunnel information.

At operation S1130, receive group-level routing information of the first UPF entity, and issuing group-level routing information of the opposite-end UPF entity to the first UPF entity, so that the first UPF entity creates the group-level routing information of the first UPF entity according to the group-level routing information of each opposite-end UPF entity, and performs communication between UE in the VN group according to the group-level routing information of the first UPF entity.

In the group user communication method provided in the present application, the NRF receives the NF discovery request of the UPF, so that the UPF entity can search, through the NFDiscovery interface, the information of the opposite-end UPF associated with the VN group from the NRF entity, and then establish the N19 tunnel by itself, learn information of the IP/MAC forwarding table to generate and store the group-level routing information of the current UPF; the UPF implement group equipment communication across the UPFs according to the group-level routing information, implement dynamic creation of group network across the SMFs, and complexity of network operation and maintenance is simplified.

In some implementations, the communication between the UE includes packet forwarding, the first UPF entity is associated with first UE; in a case where the first UPF entity receives a packet forwarding request of the first UE, to request for forwarding a packet to a target UE in a same VN group, the group-level routing information of the first UPF entity is configured to determine a UPF entity associated with the target UE, so that the first UPF entity forwards the packet requested to be forwarded to the target UE through the UPF entity associated with the target UE.

In some implementations, before operation S1110, the group user communication method further includes: receiving a registration request sent by the first UPF entity, wherein the registration request carries registration information at least including VN group information supported by the first UPF entity; and storing the VN group information supported by the first UPF entity and sending a registration response to the first UPF entity to indicate that the first UPF entity is successfully registered with a current NRF entity.

In the implementation, registration of the UPF with the NRF entity may be implemented, so that the UPF becomes a registered UPF device on the NRF entity for subsequent group equipment communication.

In some implementations, the registration information further includes group-level tunnel information associated with the current UPF entity, and after sending a registration response to the first UPF entity, the group user communication method further includes operations S71 to S73.

At operation S71, receive a registration update request of the first UPF entity, wherein the registration update request carries updated registration information being the registration information updated by the first UPF entity according to a preset trigger event. At operation S72, store the updated registration information. At operation S73, send a registration update response to the first UPF entity to indicate that the first UPF entity is successfully updated and registered with the current NRF entity.

In the implementation, after registration of the UPF with the NRF entity is successful, the registration information may be updated with the NRF when the UPF configuration is changed, or a new group or user is accessed.

In some implementations, if the registration information further includes equipment information in the VN group, the updated registration information includes updated equipment information, and after operation S72, the group user communication method further includes operation S74.

At operation S74, send a change notification of the registration information to a UPF entity subscribed to the registration information.

In the implementation, the NRF may check whether other UPF subscribes to the registration information, including one of an implicit subscription and an explicit subscription, so as to send a change notification messages to related UPFs.

In some implementations, after operation S1130, the group user communication method further includes operations S1140 to S1160.

At operation S1140, receive a group-level session update request sent by the first UPF entity. At operation S1150, store updated group-level routing information of the first UPF entity. At operation S1160, send a group-level session change notification to the opposite-end UPF entity associated with the VN group, wherein the group-level session change notification carries the updated group-level routing information.

The above group-level session update request includes: a first group-level session update request carrying the updated group-level routing information of the first UPF entity; or a second group-level session update request carrying a new MAC address of a first UE; or a third group-level session update request carrying an aged MAC address of the first UE.

In some implementations, after operation S1130, the group user communication method further includes sending a group-level session change notification to the opposite-end UPF entity associated with the VN group, wherein the group-level session change notification carries the updated group-level routing information of the first UPF entity.

According to the group user communication method provided in the present application, when any member UE in the VN group creates a N4 session, the SMF only issues information of the group identifier, and does not issue the PDR and the FAR of the group; the UPF finds the opposite-end UPF associated with the VN group from the NRF, reports the group-level routing information of the UPF to the NRF entity, and receives the group-level routing information of the opposite-end UPF issued by the NRF, thereby learning opposite-end routing independently, and triggering the opposite-end UPF to update the group-level routing information of the UPF, so as to facilitate subsequent dynamic creation of the group network across UPFs or SMFs, and implement the group communication across UPFs or SMFs.

Figure 12:
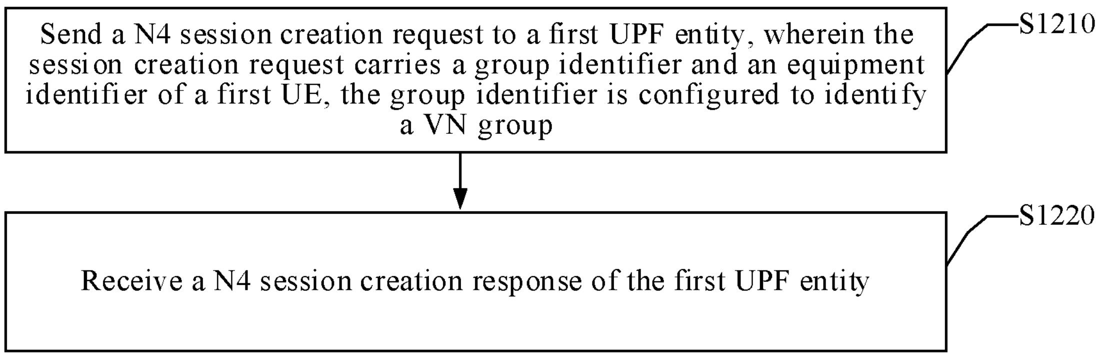
FIG. 12 is a flowchart of a group user communication method according to the present application.

FIG. 12 is a flowchart of a group user communication method according to the present application. The group user communication method may be applied to a SMF, and includes operations S1210 and S1220.

At operation S1210, send a N4 session creation request to a first UPF entity, wherein the session creation request carries a group identifier and an equipment identifier of a first UE, the group identifier is configured to identify a VN group.

At operation S1220, receive a N4 session creation response of the first UPF entity.

In a process of the first UPF entity creating the N4 session for the first UE, group-level routing information corresponding to the equipment information of the first UE is added to group-level routing information of the first UPF entity, and communication between UE in the VN group is performed according to the group-level routing information of the first UPF entity.

In the group user communication method provided in the present application, when sending the N4 session creation request to the first UPF entity, the SMF only issues the information of the group identifier, and does not issue group PDR and FAR, so that the group user communication does not rely on PDR and FAR instructions issued by the SMF any more, dependency of the UPF on the control plane in 5G LAN deployment scenario is reduced, and the N4 interface message bandwidth and signaling interaction flow are simplified.

In some implementations, the communication between the UE includes packet forwarding; in a case where the first UPF entity receives a packet forwarding request of the first UE, if the packet forwarding request is configured to request for forwarding a packet to a target UE in a same VN group, the group-level routing information of the first UPF entity is configured to determine a UPF entity associated with the target UE, so that the first UPF entity forwards the packet requested to be forwarded to the target UE through the UPF entity associated with the target UE.

The group user communication method provided in the application can enhance self-deployment and autonomous capability of the UPF in 5G LAN deployment scene, dependency on the control plane is reduced, the packet bandwidth of a N4 interface and a signaling interaction flow is simplified, an elastic autonomous network model is provided for UE, free mobile access LAN session is supported to cross regions; the method meets the service requirement of cross-regional intercommunication, makes full use of the 5GC network, and accelerates the application of 5G LAN service.

5G LAN technology is mainly applied to vertical industries, and the group user communication method provided in the application can be applied to the industries such as coal mines, power grids and industrial control and the like; for example, a sunk private network, a cross-regional private network service of a medium-large enterprise, a cross-regional control service of an industrial control field and the like.

The group user communication apparatus is described in detail below with reference to the accompanying drawings.

Figure 13:
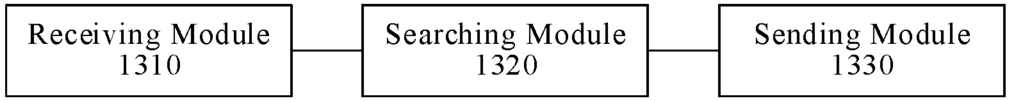
FIG. 13 is a schematic structural diagram of a group user communication apparatus according to the present application.

FIG. 13 is a schematic structural diagram of a group user communication apparatus according to the present application. As shown in FIG. 13, the group user communication apparatus is applied to a UPF entity, and may include a receiving module 1310, a searching module 1320, and a sending module 1330.

The receiving module 1310 is configured to receive a packet forwarding request of a first UE, wherein the packet forwarding request is configured to request for forwarding a packet to a target UE, the first UE and the target UE are UE of a same VN group.

The searching module 1320 is configured to determine a UPF entity associated with the target UE by searching group-level routing information of a current UPF entity.

The sending module 1330 is configured to forward the packet requested to be forwarded to the target UE through the UPF entity associated with the target UE.

In some implementations, the sending module 1330 is further configured to, before receiving the packet forwarding request of the first UE, send a registration request to a NRF entity after the current UPF entity is powered on, wherein the registration request carries registration information at least including VN group information supported by the current UPF entity; the receiving module 1310 is further configured to receive a registration response returned by the NRF entity in response to the registration request, so as to determine that the current UPF entity is successfully registered on the NRF entity.

In some implementations, the registration information further includes group-level tunnel information associated with the current UPF entity, and the sending module 1330 is further configured to, after the current UPF entity is determined to be successfully registered on the NRF entity, initiate a registration update request to the NRF entity triggered by a preset trigger event, the registration update request carries updated registration information, the preset trigger event includes at least one of: the VN group information configured by the current UPF entity is changed, the current UPF entity accesses a new VN group, or the group-level tunnel associated with the current UPF entity is changed; the receiving module 1310 is further configured to receive a registration update response returned by the NRF entity in response to the registration update request, so as to determine that the current UPF entity is successfully registered and updated on the NRF entity.

In some implementations, if the registration information further includes equipment information in the VN group, the trigger event further includes that the UE is changed; the equipment information includes at least one of a network address of equipment or a MAC address of equipment; the UE changing includes a new UE accessing and an existing UE being offline.

In some implementations, the group user communication apparatus may further include the receiving module 1310, a route learning module, a triggering module, and the sending module 1330. The receiving module 1310 is further configured to before receiving a packet forwarding request of first UE, receive a N4 session creation request of a SMF entity, wherein the session creation request carries a group identifier and an equipment identifier of the first UE, and the group identifier is configured to identify the VN group; the route learning module is configured to, if the current UPF entity finds creation information of the VN group, add group-level routing information corresponding to equipment information of the first UE to the group-level routing information of the current UPF entity; the triggering module is configured to trigger an opposite-end UPF entity associated with the VN group to update group-level routing information of the opposite-end UPF entity according to UE address information of the first UE; the sending module 1330 is further configured to return a session creation response to the SMF entity for indicating that the N4 session creation of the first UE is successful.

In some implementations, the group user communication apparatus may further include the sending module 1330, the receiving module 1310, a tunnel establishment module, the route learning module. If the current UPF entity does not find the creation information of the VN group, the sending module 1330 is further configured to, before adding group-level routing information corresponding to equipment information of the first UE to the group-level routing information of the current UPF entity, send a NF discovery request including the group identifier to a NRF entity; the receiving module 1310 is further configured to receive a NF discovery response returned by the NRF entity in response to the NF discovery request, wherein the NF discovery response carries UPF information of the opposite-end UPF and opposite-end tunnel information; the tunnel establishment module is configured to establish, by the current UPF entity, a group-level N19 tunnel of the VN group; the sending module 1330 is further configured to report the group-level routing information of the current UPF entity to the NRF entity; the route learning module is configured to generate the group-level routing information of the current UPF entity according to the group-level routing information of the opposite-end UPF entity issued by the NRF entity.

In some implementations, if registration information carried in a registration request sent by the current UPF entity to the NRF entity includes equipment information in the VN group, the triggering module is further configured to send a first group-level session update request to the NRF entity, wherein the first group-level session update request carries equipment information of the first UE, and is configured to request the NRF entity to notify each opposite-end UPF entity of adding the group-level routing information corresponding to the equipment information of the first UE.

In some implementations, if registration information carried in a registration request sent by the current UPF entity to the NRF entity includes equipment information in the VN group, the triggering module is further configured to send a first access notification to each opposite-end UPF entity through the sending module 1330, wherein the first access notification carries the equipment information of the first UE, so as to notify each opposite-end UPF entity of adding the group-level routing information corresponding to the equipment information of the first UE.

In some implementations, if it is detected that a new MAC address accesses the first UE, the sending module 1330 is further configured to send a second group-level session update request to a NRF entity registered with the current UPF entity, wherein the second group-level session update request carries the new MAC address of the first UE, so as to request the NRF entity to notify each opposite-end UPF entity associated with the VN group of adding group-level routing information corresponding to the new MAC address.

In some implementations, if it is detected that a new MAC address accesses the first UE, and registration information carried in a registration request sent by the current UPF entity to the NRF entity includes equipment information in the VN group, the sending module 1330 is further configured to send a second access notification to each opposite-end UPF entity associated with the VN group, wherein the second access notification carries the new MAC address of the first UE, so as to notify each opposite-end UPF entity of adding group-level routing information corresponding to the new MAC address of the first UE.

In some implementations, if an aged MAC address is monitored, the sending module 1330 is further configured to send a third group-level session update request to a NRF entity registered with the current UPF entity to request the NRF entity to notify each opposite-end UPF entity associated with the VN group of deleting group-level routing information corresponding to the aged MAC address; if an aged MAC address is monitored, and registration information carried in a registration request sent by the current UPF entity to the NRF entity includes equipment information in the VN group, the sending module 1330 is further configured to send a third access notification to each opposite-end UPF associated with the VN group, wherein the third access notification carries the aged MAC address of the first UE, so as to notify each opposite-end UPF entity associated with the VN group of deleting group-level routing information corresponding to the aged MAC address, wherein the aged MAC address is a MAC address of a UE associated with the current UPF entity, and no corresponding packet interaction of the aged MAC address exists within a preset MAC address aging duration.

In some implementations, if the packet requested to be forwarded is a unicast packet, the sending module 1330 is further configured to, if the UPF entity associated with the target UE is the current UPF entity, forward the packet requested to be forwarded to the target UE in a local exchange mode; if the UPF entity associated with the target UE is any one of opposite-end UPF entities in the VN group, forward the packet requested to be forwarded to the opposite-end UPF entity associated with the target UE through a group-level N19 tunnel, so as to forward the packet to the target UE through the opposite-end UPF entity associated with the target UE.

In some implementations, the packet requested to be forwarded is a multicast packet or a broadcast packet, the sending module 1330 is further configured to forward the packet requested to be forwarded to a local UE through a local exchange mode, wherein the local UE is UE associated with the current UPF entity in the VN group; and forward the packet requested to be forwarded to an opposite-end UPF entity associated with other UE through a group-level N19 tunnel, so as to forward the packet requested to be forwarded to the other UE through the opposite-end UPF entity associated with the other UE, wherein the other UE is UE associated with any one of the opposite-end UPF entities in the VN group.

In some implementations, the receiving module 1310 is further configured to receive a packet sent by an opposite-end UPF entity in the VN group, wherein the packet sent by the opposite-end UPF entity carries a destination address of the packet, and the UE corresponding to the destination address of the packet is associated with the current UPF entity; and the sending module 1330 is further configured to forward the packet sent by the opposite-end UPF entity to the UE corresponding to the destination address of the packet.

In some implementations, if the packet sent by the opposite-end UPF entity is a unicast packet, the UE corresponding to the destination address of the packet is one of the UE associated with the current UPF entity; and if the packet sent by the opposite-end UPF entity is a multicast packet or a broadcast packet, the UE corresponding to the destination address of the packet is each UE associated with the current UPF entity.

According to the group user communication method provided in the present application, when the current UPF entity receives a packet of any one UE in the 5G VN group and needs to forward the packet to the target UE in the same 5G VN group, the packet requested to be forwarded to the target UE through the inquired UPF entity associated with the target UE, thereby realizing that group network is dynamically created across UPFs. Since the UPF is not limited to be associated with a same SMF, the group network can be dynamically created across the SMFs, and complexity of network operation and maintenance is simplified.

Figure 14:
FIG. 14 is a schematic structural diagram of a group user communication apparatus according to the present application.
Figure 14:
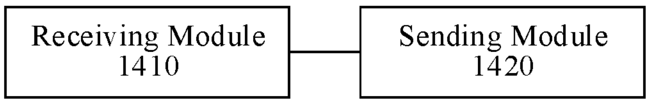

FIG. 14 is a schematic structural diagram of a group user communication apparatus according to the present application. As shown in FIG. 14, the group user communication apparatus is applied to a NRF entity, and may include a receiving module 1410 and a sending module 1420.

The receiving module 1410 is configured to receive a NF discovery request of a first UPF entity, wherein the NF discovery request includes a group identifier being identifier information sent to the first UPF entity by a SMF entity and configured to identify a VN group.

The sending module 1420 is configured to send a NF discovery response to the first UPF entity, wherein the NF discovery response carries UPF information of an opposite-end UPF entity associated with the VN group and opposite-end tunnel information.

The receiving module 1410 is further configured to receive group-level routing information of the first UPF entity, and issue group-level routing information of the opposite-end UPF entity to the first UPF entity, so that the first UPF entity creates the group-level routing information of the first UPF entity according to the group-level routing information of each opposite-end UPF entity, and performs communication between UE in the VN group according to the group-level routing information of the first UPF entity.

In some implementations, the communication between the UE includes packet forwarding, the first UPF entity is associated with first UE; in a case where the first UPF entity receives a packet forwarding request of the first UE, to request for forwarding a packet to a target UE in a same VN group, the group-level routing information of the first UPF entity is configured to determine a UPF entity associated with the target UE, so that the first UPF entity forwards the packet requested to be forwarded to the target UE through the UPF entity associated with the target UE.

In some implementations, the group user communication apparatus may further include the receiving module 1410, a storage module, the sending module 1420. The receiving module 1410 is further configured to, before receiving a NF discovery request of a first UPF entity, receive a registration request sent by the first UPF entity, wherein the registration request carries registration information at least including VN group information supported by the first UPF entity; the storage module is configure to store the VN group information supported by the first UPF entity; the sending module 1420 is further configured to send a registration response to the first UPF entity to indicate that the first UPF entity is successfully registered with a current NRF entity.

In some implementations, the registration information further includes group-level tunnel information associated with the first UPF entity; the receiving module 1410 is further configured to, after send a registration response to the first UPF entity, receive a registration update request of the first UPF entity, wherein the registration update request carries updated registration information being the registration information updated by the first UPF entity according to a preset trigger event; the storage module is further configure to store the updated registration information; the sending module 1420 is further configured to send a registration update response to the first UPF entity to indicate that the first UPF entity is successfully updated and registered with the current NRF entity.

In some implementations, the registration information further includes equipment information in the VN group, the updated registration information includes updated equipment information; the sending module 1420 is further configured to, after storing the updated registration information, send a change notification of the registration information to a UPF entity subscribed to the registration information.

In some implementations, the receiving module 1410 is further configured to after issuing group-level routing information of the opposite-end UPF entity to the first UPF entity, receive a group-level session update request sent by the first UPF entity; the storage module is further configure to store updated group-level routing information of the first UPF entity; the sending module 1420 is further configured to send a group-level session change notification to the opposite-end UPF entity associated with the VN group, wherein the group-level session change notification carries the updated group-level routing information; the group-level session update request includes: a first group-level session update request carrying the updated group-level routing information of the first UPF entity; or a second group-level session update request carrying a new MAC address of first UE; or a third group-level session update request carrying an aged MAC address of first UE.

In some implementations, the sending module 1420 is further configure to, after issuing group-level routing information of the opposite-end UPF entity to the first UPF entity, send a group-level session change notification to the opposite-end UPF entity associated with the VN group, wherein the group-level session change notification carries updated group-level routing information of the first UPF entity.

According to the group user communication apparatus provided in the present application, the NRF receives the NF discovery request of the UPF, so that the UPF entity can search, through the NFDiscovery interface, the information of the opposite-end UPF associated with the VN group from the NRF entity, and then establish the N19 tunnel by itself, learn information of the IP/MAC forwarding table to generate and store the group-level routing information of the current UPF; the UPF implement group equipment communication across the UPFs according to the group-level routing information.

Figure 15:
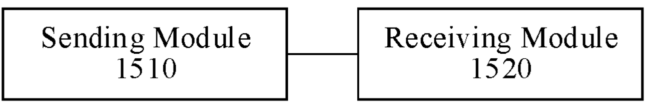
FIG. 15 is a schematic structural diagram of a group user communication apparatus according to the present application.

FIG. 15 is a schematic structural diagram of a group user communication apparatus according to the present application. As shown in FIG. 15, the group user communication apparatus is applied to a SMF entity, and may include a sending module 1510 and a receiving module 1520.

The sending module 1510 is configured to send a N4 session creation request to a first UPF entity, wherein the session creation request carries a group identifier and an equipment identifier of a first UE, the group identifier is configured to identify a VN group.

The receiving module 1520 is configured to receive a N4 session creation response of the first UPF entity.

In a process of the first UPF entity creating the N4 session for the first UE, group-level routing information corresponding to the equipment information of the first UE is added to group-level routing information of the first UPF entity, and communication between UE in the VN group is performed according to the group-level routing information of the first UPF entity.

In some implementations, communication between the user equipment includes packet forwarding; in a case where the first UPF entity receives a packet forwarding request of the first UE, if the packet forwarding request is configured to request for forwarding a packet to a target UE in a same VN group, the group-level routing information of the first UPF entity is configured to determine a UPF entity associated with the target UE, so that the first UPF entity forwards the packet requested to be forwarded to the target UE through the UPF entity associated with the target UE.

According to the group user communication apparatus provided in the present application, when sending the N4 session creation request to the first UPF entity, the SMF only issues the information of the group identifier, and does not issue group PDR and FAR, so that the group user communication does not rely on PDR and FAR instructions issued by the SMF any more, dependency of the UPF on the control plane in 5G LAN deployment scenario is reduced, and the N4 interface message bandwidth and signaling interaction flow are simplified.

It should be understood that the present application is not limited to the specific configurations and processing described above and illustrated in the accompanying drawings. For convenience and simplicity of description, detailed description of known methods is omitted in the present application, specific working processes of the system, the module and the component described above may refer to corresponding processes of the above method, which are not repeated here.

Figure 16:
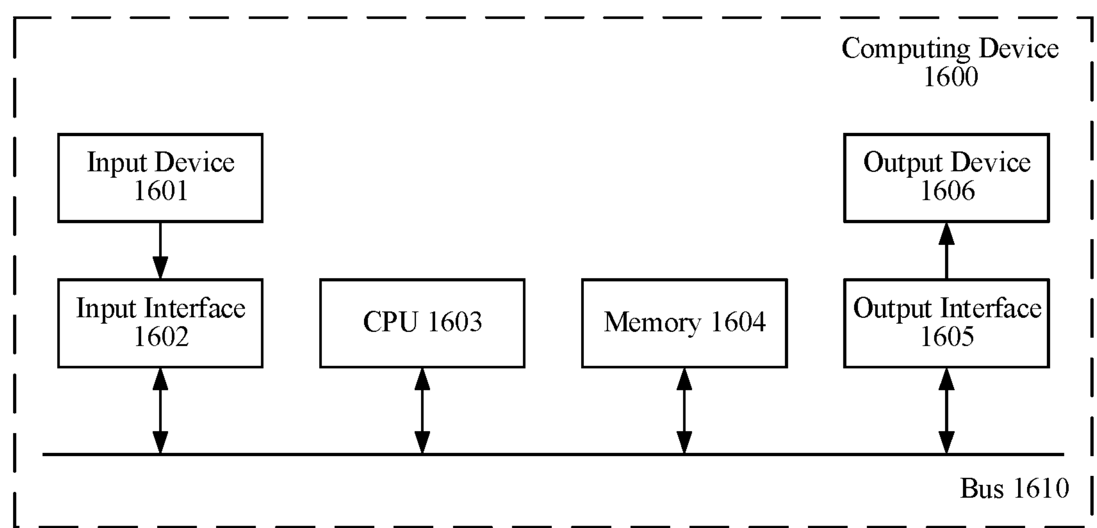
FIG. 16 is a schematic diagram of exemplary hardware architecture of a computing device for implementing a group user communication method or a group user communication apparatus according to the present application.

FIG. 16 is a schematic diagram of exemplary hardware architecture of a computing device for implementing a group user communication method or a group user communication apparatus according to the present application.

As shown in FIG. 16, the computing device 1600 includes an input device 1601, an input interface 1602, a central processing unit (CPU) 1603, a memory 1604, an output interface 1605, and an output device 1606. The input interface 1602, the CPU 1603, the memory 1604, and the output interface 1605 are connected via a bus 1610, and the input device 1601 and the output device 1606 are connected to the bus 1610, and further to other components of the computing device 1600, via the input interface 1602 and the output interface 1605, respectively.

The input device 1601 receives input information from outside and transmits the input information to the CPU 1603 through the input interface 1602; the CPU 1603 processes the input information based on computer-executable instructions stored in the memory 1604 to generate output information, temporarily or permanently stores the output information in the memory 1604, and then transmits the output information to the output device 1606 through the output interface 1605; the output device 1606 outputs the output information outside of the computing device 1600 for use by a user.

In some implementations, the computing device shown in FIG. 16 may be implemented as a network device including: a memory configured to store a computer program; and a processor configured to execute the computer program stored in the memory to perform the group user communication method described above.

The present application further provides a computer-readable storage medium having a computer program stored thereon, the computer program, when executed by a processor, causes the processor to perform the group user communication method described above.

The above description is only for exemplary embodiments of the present application, but is not intended to limit the scope of the present application. In general, the present application may be implemented in hardware or special purpose circuits, software, logic or any combination thereof. For example, some aspects may be implemented in hardware, while other aspects may be implemented in firmware or software which may be executed by a controller, a microprocessor or other computing devices, although the present application is not limited thereto.

The present application may be implemented by a data processor of a mobile device executing computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object code written in any combination of one or more programming languages.

The block diagram of any logical flowchart in the accompanying drawings of the present application may represent program operations; or may represent interconnected logic circuits, modules, and functions; or may represent a combination of program operations and logic circuits, modules, and functions. The computer program may be stored in the memory. The memory may be of any type suitable for the local technical environment and may be implemented by using any suitable data storage technology, such as, but is not limited to, a Random Access Memory (RAM), a Read-Only Memory (ROM), an optical storage device and system (a digital video disc (DVD) or a compact disc (CD)) and the like. The computer-readable medium may include a non-transitory storage medium. The data processor may be of any type suitable for the local technical environment, such as, but is not limited to, a general computer, a specific computer, a microprocessor, a digital signal processor (DSP), an application specific integrated circuit (ASIC), a field programmable gate array (FPGA), and a processor based on a multi-core processor architecture.

Through exemplary and non-limiting examples, a detailed description of the exemplary embodiments of the present application is provided above. Various modifications and adaptations to the above embodiments may be apparent to those skilled in the relevant art with reference to the accompanying drawings and the appended claims, without departing from the scope of the application. Accordingly, the proper scope of the present application is to be determined according to the claims.

What is claimed is:

1. A group user communication method, applied to a user plane function (UPF) entity, comprising:

receiving a packet forwarding request of a first user equipment, wherein the packet forwarding request is configured to request for forwarding a packet to a target user equipment, the first user equipment and the target user equipment are user equipment of a same virtual network group;

determining a UPF entity associated with the target user equipment by searching group-level routing information of a current UPF entity; and forwarding the packet requested to be forwarded to the target user equipment through the UPF entity associated with the target user equipment, before receiving the packet forwarding request of the first user equipment, receiving a N4 session creation request of a session management function (SMF) entity, wherein the session creation request carries a group identifier and an equipment identifier of the first user equipment, and the group identifier is configured to identify the virtual network group;

in response to that the current UPF entity finds creation information of the virtual network group, adding group-level routing information corresponding to equipment information of the first user equipment to the group-level routing information of the current UPF entity;

triggering an opposite-end UPF entity associated with the virtual network group to update group-level routing information of the opposite-end UPF entity according to user equipment address information of the first user equipment; and returning a session creation response to the SMF entity for indicating that the N4 session creation of the first user equipment is successful; or in response to that the current UPF entity does not find the creation information of the virtual network group, the method further comprises:

before adding group-level routing information corresponding to equipment information of the first user equipment to the group-level routing information of the current UPF entity, sending a network function (NF) discovery request comprising the group identifier to a NRF entity;

receiving a NF discovery response returned by the NRF entity in response to the NF discovery request, wherein the NF discovery response carries UPF information of the opposite-end UPF and opposite-end tunnel information;

establishing, by the current UPF entity, a group-level N19 tunnel of the virtual network group;

reporting the group-level routing information of the current UPF entity to the NRF entity; and generating the group-level routing information of the current UPF entity according to the group-level routing information of the opposite-end UPF entity issued by the NRF entity.

2. The method of claim 1, further comprising:

before receiving the packet forwarding request of the first user equipment, sending a registration request to a network repository function (NRF) entity after the current UPF entity is powered on, wherein the registration request carries registration information at least comprising virtual network group information supported by the current UPF entity; and receiving a registration response returned by the NRF entity in response to the registration request, so as to determine that the current UPF entity is successfully registered on the NRF entity.

3. The method of claim 2, wherein the registration information further comprises group-level tunnel information associated with the current UPF entity, and the method further comprises:

after the current UPF entity is determined to be successfully registered on the NRF entity, initiating a registration update request to the NRF entity triggered by a preset trigger event, wherein the registration update request carries updated registration information, the preset trigger event comprises at least one of: the virtual network group information configured by the current UPF entity is changed, the current UPF entity accesses a new virtual network group, or the group-level tunnel associated with the current UPF entity is changed; and receiving a registration update response returned by the NRF entity in response to the registration update request, so as to determine that the current UPF entity is successfully registered and updated on the NRF entity.

4. The method of claim 3, wherein in response to that the registration information further comprises equipment information in the virtual network group, the trigger event further comprises that the user equipment is changed, wherein the equipment information comprises at least one of a network address of equipment or a media access control layer (MAC) address of equipment, the user equipment changing comprises a new user equipment accessing and an existing user equipment being offline.

5. The method of claim 1, wherein in response to that registration information carried in a registration request sent by the current UPF entity to the NRF entity comprises equipment information in the virtual network group, triggering the opposite-end UPF entity associated with the virtual network group to update group-level routing information of the opposite-end UPF entity according to user equipment address information of the first user equipment comprises:

sending a first group-level session update request to the NRF entity, wherein the first group-level session update request carries equipment information of the first user equipment, and is configured to request the NRF entity to notify each opposite-end UPF entity of adding the group-level routing information corresponding to the equipment information of the first user equipment; or sending a first access notification to each opposite-end UPF entity, wherein the first access notification carries the equipment information of the first user equipment, so as to notify each opposite-end UPF entity of adding the group-level routing information corresponding to the equipment information of the first user equipment.

6. The method of claim 1, wherein in response to that a new MAC address is detected to access the first user equipment, the method further comprises:

sending a second group-level session update request to a NRF entity registered with the current UPF entity, wherein the second group-level session update request carries the new MAC address of the first user equipment, so as to request the NRF entity to notify each opposite-end UPF entity associated with the virtual network group of adding group-level routing information corresponding to the new MAC address; or in response to it is detected that a new MAC address accesses the first user equipment, and registration information carried in a registration request sent by the current UPF entity to the NRF entity comprises equipment information in the virtual network group, the method further comprises:

sending a second access notification to each opposite-end UPF entity associated with the virtual network group, wherein the second access notification carries the new MAC address of the first user equipment, so as to notify each opposite-end UPF entity of adding group-level routing information corresponding to the new MAC address of the first user equipment.

7. The method of claim 1, wherein in response to that an aged MAC address is monitored, the method further comprises:

sending a third group-level session update request to a NRF entity registered with the current UPF entity to request the NRF entity to notify each opposite-end UPF entity associated with the virtual network group of deleting group-level routing information corresponding to the aged MAC address; or in response to that an aged MAC address is monitored, and registration information carried in a registration request sent by the current UPF entity to the NRF entity comprises equipment information in the virtual network group, the method further comprises:

sending a third access notification to each opposite-end UPF associated with the virtual network group, wherein the third access notification carries the aged MAC address of the first user equipment, so as to notify each opposite-end UPF entity associated with the virtual network group of deleting group-level routing information corresponding to the aged MAC address, wherein the aged MAC address is a MAC address of a user equipment associated with the current UPF entity, and no corresponding packet interaction of the aged MAC address exists within a preset MAC address aging duration.

8. The method of claim 1, wherein in response to that the packet requested to be forwarded is a unicast packet, forwarding the packet requested to be forwarded to the target user equipment through the UPF entity associated with the target user equipment comprises:

in response to that the UPF entity associated with the target user equipment is the current UPF entity, forwarding the packet requested to be forwarded to the target user equipment in a local exchange mode; or in response to that the UPF entity associated with the target user equipment is any one of opposite-end UPF entities in the virtual network group, forwarding the packet requested to be forwarded to the opposite-end UPF entity associated with the target user equipment through a group-level N19 tunnel, so as to forward the packet to the target user equipment through the opposite-end UPF entity associated with the target user equipment.

9. The method of claim 1, wherein the packet requested to be forwarded is a multicast packet or a broadcast packet, and forwarding the packet requested to be forwarded to the target user equipment through the UPF entity associated with the target user equipment comprises:

forwarding the packet requested to be forwarded to a local user equipment through a local exchange mode, wherein the local user equipment is user equipment associated with the current UPF entity in the virtual network group; and forwarding the packet requested to be forwarded to an opposite-end UPF entity associated with other user equipment through a group-level N19 tunnel, so as to forward the packet requested to be forwarded to the other user equipment through the opposite-end UPF entity associated with the other user equipment, wherein the other user equipment is user equipment associated with any one of the opposite-end UPF entities in the virtual network group.

10. The method of claim 1, further comprising:

receiving a packet sent by an opposite-end UPF entity in the virtual network group, wherein the packet sent by the opposite-end UPF entity carries a destination address of the packet, and a user equipment corresponding to the destination address of the packet is associated with the current UPF entity; and forwarding the packet sent by the opposite-end UPF entity to the user equipment corresponding to the destination address of the packet.

11. The method of claim 10, wherein in response to that the packet sent by the opposite-end UPF entity is a unicast packet, the user equipment corresponding to the destination address of the packet is one user equipment associated with the current UPF entity; and in response to that the packet sent by the opposite-end UPF entity is a multicast packet or a broadcast packet, the user equipment corresponding to the destination address of the packet is each user equipment associated with the current UPF entity.

12. A network device, comprising:

at least one processor; and a memory having at least one computer program stored thereon, the at least one computer program, when executed by the at least one processor, causes the at least one processor to implement the group user communication method of claim 1.

13. A non-transitory computer-readable storage medium having a computer program stored thereon, the computer program, when executed by a processor, causes the processor to implement the group user communication method of claim 1.

14. A group user communication method, applied to a network repository function (NRF) entity, comprising:

receiving a network function (NF) discovery request of a first user plane function (UPF) entity, wherein the NF discovery request comprises a group identifier being identifier information sent to the first UPF entity by a session management function (SMF) entity and configured to identify a virtual network group;

sending a NF discovery response to the first UPF entity, wherein the NF discovery response carrying UPF information of an opposite-end UPF entity associated with the virtual network group and opposite-end tunnel information; and receiving group-level routing information of the first UPF entity, and issuing group-level routing information of the opposite-end UPF entity to the first UPF entity, so that the first UPF entity creates the group-level routing information of the first UPF entity according to the group-level routing information of each opposite-end UPF entity, and performs communication between user equipment in the virtual network group according to the group-level routing information of the first UPF entity.

15. The method of claim 14, further comprising:

before receiving the NF discovery request of the first UPF entity, receiving a registration request sent by the first UPF entity, wherein the registration request carries registration information at least comprising virtual network group information supported by the first UPF entity;

storing the virtual network group information supported by the first UPF entity; and sending a registration response to the first UPF entity to indicate that the first UPF entity is successfully registered with a current NRF entity.

16. The method of claim 15, wherein the registration information further comprises group-level tunnel information associated with the first UPF entity, and the method further comprises:

after sending the registration response to the first UPF entity, receiving a registration update request of the first UPF entity, wherein the registration update request carries updated registration information being the registration information updated by the first UPF entity according to a preset trigger event;

storing the updated registration information; and sending a registration update response to the first UPF entity to indicate that the first UPF entity is successfully updated and registered with the current NRF entity.

17. The method of claim 16, wherein the registration information further comprises equipment information in the virtual network group, the updated registration information comprises updated equipment information, and the method further comprise:

after storing the updated registration information, sending a change notification of the registration information to a UPF entity subscribed to the registration information.

18. The method of claim 14, further comprising:

after issuing the group-level routing information of the opposite-end UPF entity to the first UPF entity, receiving a group-level session update request sent by the first UPF entity;

storing updated group-level routing information of the first UPF entity;

sending a group-level session change notification to the opposite-end UPF entity associated with the virtual network group, wherein the group-level session change notification carries the updated group-level routing information, wherein the group-level session update request comprises:

a first group-level session update request carrying the updated group-level routing information of the first UPF entity;

a second group-level session update request carrying a new MAC address of first user equipment; or a third group-level session update request carrying an aged MAC address of first user equipment.

19. A group user communication method, applied to a session management function (SMF) entity, comprising:

sending a N4 session creation request to a first user plane function (UPF) entity, wherein the session creation request carries a group identifier and an equipment identifier of a first user equipment, the group identifier is configured to identify a virtual network group; and receiving a N4 session creation response of the first UPF entity, wherein in a process of the first UPF entity creating the N4 session for the first user equipment, group-level routing information corresponding to the equipment information of the first user equipment is added to group-level routing information of the first UPF entity, and communication between user equipment in the virtual network group is performed according to the group-level routing information of the first UPF entity.

* * * * *